METHOD AND DEVICES FOR THE DETERMINATION OF COLORS AND COLOR TOLERANCES IN A VISUAL MANNER IN ANY KIND OF ARTIFICIAL LIGHT OR SUNLIGHT

Original Filed June 26, 1965 15 Sheets-Sheet 1

United States Patent Office 3,672,780

Patented June 27, 1972

3,672,780

METHOD AND DEVICES FOR THE DETERMINATION OF COLORS AND COLOR TOLERANCES IN A VISUAL MANNER IN ANY KIND OF ARTIFICIAL LIGHT OR SUNLIGHT

Fritz Piringer, Graf Starhemberggasse 13, Stiege 10, Vienna IV, Austria

Continuation of application Ser. No. 290,712, June 26, 1965. This application Mar. 26, 1970, Ser. No. 22,110
Int. Cl. G01j *3/48, 3/52*
U.S. Cl. 356—195 27 Claims

ABSTRACT OF THE DISCLOSURE

A visual comparison method and apparatus in which an image of a sample is presented in an image plane with a plurality of differing color comparison regions whose color attributes, i.e. hue, saturation and darkness can be progressively adjusted so that the color of the sample can be visually compared with the comparison regions to establish color correspondence with one region. In order to facilitate such matching a number of proposals are provided: (1) either the sample image or the comparison regions are temporarily eliminated; (2) the sample image and the corresponding comparison region are replaced by a dull color; (3) the borderlines between the sample image and the comparison regions are periodically shifted; (4) a complementary color is superimposed on the field of vision to increase contrast between the sample color and the comparison regions. In order to permit different sample objects to be viewed under different illumination requirements, the sample objects are supported in respective holders with corresponding optical devices providing the particular illumination requirement, the holders being interchangeable in a housing containing a viewer and the means for producing the color comparison regions.

This application is a continuation of my earlier application Ser. No. 290,712 filed June 26, 1965, and now abandoned.

In my copending application Ser. No. 262,985, filed Mar. 5, 1963, there was described a method of determining colors and color tolerances in a visual manner in any kind of artificial light or sunlight, wherein a number of variable comparison color fields are presented simultaneously in a field of vision, with at least one image of an area of a sample. The colors of the said color comparison fields are then changed successively until the color difference between one of the fields and the sample is reduced to a minimum, as perceived by comparison of the neighboring fields and the image of the sample.

A device for carrying out the above method is also disclosed in my said copending application, the said device consisting mainly of a number of movable diaphragm plates and one immovable diaphragm plate arranged in the ray path of any desired light source, said diaphragm plates having transparent as well as opaque areas, the movement of the movable diaphragm plates causing its opaque areas to cover the transparent areas of the immovable diaphragm plate alternately and in varying degrees. The diaphragm plates are provided with fixed and movable scales and reading marks. Associated with each of the transparent areas on the immovable diaphragm plate are light-deviating units which are respectively directed toward an individual test color surface and against a sample holder with a sample. The comparison colors are produced by the combination of reflections from a chromatic test color surface and a neutral-gray test color surface. Associated with the chromatic test color surfaces is an optical light mixing device, preferably a set of glass plates, and each of the neutral grey test color surfaces also has associated with it an optical light mixing device, preferably a set of glass plates. Mirrors are provided for bending the ray path. A multiple light-deflecting element is further provided together with a multiple discontinuous specular surface, which form the simultaneous field of vision, which is visible through an ocular.

The visual determination of colors and color tolerances in artificial light or sunlight, i.e. with directed light, does not fully satisfy the needs of the color expert. In daily practice, by far the most common circumstance is the comparison of two color samples with the naked eye in diffuse daylight under covered sky. The apparatus of human vision, constituted by the eye and the brain, functions under its normal natural conditions, being adapted for these light conditions and for this kind of light. Added to this is the fact that in northern countries, color determination with the aid of the sun is possible only under exceptionally favorable circumstances. Normally, only diffuse daylight is available.

The light conditions created by artificial light vary according to the light source. With few exceptions, two colors, which are held to be the same in bright, diffuse daylight, provided to be not too different when viewed in artificial light.

A different condition arises, however, in the production or mixing of colors in artificial light. There is no chance of obtaining an accurate reproduction in the light of an incandescent bulb. Even with so-called "daylight lamps" there is a noticeable difference between the color sample and the reproduced mixtures, when these are compared under diffuse, natural daylight. This is true even in some cases, where high quality special light sources are available, with an energy distribution practically approximating the spectrum of daylight. For this reason, at least one final control is almost invariably made under natural, diffuse daylight with the naked eye.

It is an object of the present invention to provide an improved method for visually determining colors and color tolerances under all kinds of artificial or natural light.

Preferably and as herein described, the improved method according to the invention comprises, in addition to the steps described above and disclosed in my copending application, certain further steps designed to increase the capability of the human eye to distinguish colors, particularly as regards very bright, very dark, or broken colors, and to counteract the development of disturbing phenomena within the apparatus of human vision, constituted by the eye and the brain.

In accordance with a feature of the invention, either the sample color or the comparison color is made temporarily invisible in at least one of the matching areas of the simultaneous field of vision, whereby this field of vision appears to be completely filled by one or the other. When the total impression of the originally observed field of vision is subsequently again presented suddenly, existing color deviations appear more sharply, which enables the observer to determine whether the impression of color contrast difference is equally strong in various fine matching areas of the field of vision.

In another aspect of the improved method according to the invention, either the sample color or the comparison colors are temporarily replaced in the simultaneous field of vision by different color impressions, such as by presenting a medium grey color, whereby a recovery and neutralization of the suman apparatus of vision, particularly of the cones of the retina, are achieved and the observation capability is improved.

The above-described steps of the method according to the present invention for the improvement of the discrimination capability of the observer may take place either at single points of the field of vision, for example at the fine matching points, or, preferably, on the entire field of vision.

Desirably, these visual impressions should be changed periodically, the original color and the substituted color being presented for periods of substantially equal duration. The change from one color to the other is made rapidly at a frequency below the flicker frequency of the two color presentations, so that the transition from the presentation of the original color to that of the substituted color is of a duration shorter than that of the flicker frequency, whereby there will be no color blending.

In a still further aspect of the method according to the invention, provision is made for preventing all these stimuli from acting continually on the same areas of the retina of the eye. This is accomplished by stimulating an area of the retina successively by the sample color and by the comparison colors substituted in irregular sequence and for varying periods, so that the comparison colors and the sample color remain constantly visible. This effect is multiplied by the characteristic of each simultaneous field of vision produced by the simultaneous juxtaposition of a constant sample color stimulus with a series of different and variable comparison color stimuli. To this end, the area where the comparison color fields and the sample color fields meet, that is the so-called "borderlines," are shifted simultaneously and periodically. In accordance with the known distinction between a flicker limit for color-different impressions and a flicker limit for place-different impressions, the original and substituted borderline areas are presented for an approximately equal length of time and changed with a frequency less than the flicker frequency for the corresponding movement. The duration of the transition from the original to the substituted color presentation is accordingly shorter than the previously mentioned flicker frequency.

In accordance with yet another aspect of the method of the present invention, provision is made for conducting additional, contrast-strengthening tests of the simultaneous field of vision in order to detect any remaining minimal color differences, with the aid of filtering media, which are used for all comparison color fields and sample color fields simultaneously. Preferably these tests may be made with filtering media which are complementary to the sample color, or with neutral grey filtering media, to minimize the initial glare from bright colors or white. The reliability of the control in settings with broken colors may be enhanced by use of filters sold commercially under the names "Neophanglas" or "Geophot-Filter," because the color contrasts in all areas of the simultaneous field of vision are thereby observed more sharply.

One of the most significant features of the invention is the provision of an apparatus by which colors and color tolerances may be determined visually in all kinds of natural or artificial light, with solid objects, as well as all liquid and gaseous samples using the same test colors. This satisfies a long-standing need in the field. Color determinations may be made under various angles of lighting and observation, as well as with ultraviolet transillumination or ultraviolet lighting. According to a feature of the invention, various insert means can be placed in the apparatus, each insert means being associated with a particular sample which may be solid, liquid, powder, gaseous, etc. Each of the samples has its own particular illuminating requirement, depending upon its physical characteristics. Each insert means contains a respective device which acts in cooperation with light admitted to said apparatus for supplying the particular illumination requirement for its respective sample.

By use of the apparatus in accordance with the invention, it is now possible also to characterize fluorescent colors through three color attributes and to relate these measurement values to test colors, which are illuminated with daylight or with standardized artificial light. The use of the same (solid) test colors is also possible according to the invention, when liquids are to be determined. Hitherto liquid fluorescing standards were necessary for the comparison of fluorescing liquids. For a comparison of fluorescent solid materials fluorescing comparison substances were needed. For comparisons with capillary analytic studies of filter paper strips, it was necessary to store samples of test strips as standards protected from light, having to reckon with fading of the fluorescent colors on the filter paper due to fine distribution. In accordance with the present invention, after a single determination of such standards, their color attributes are known and the difficulties of storage eliminated. The advantage of being able to relate all determinations to a single test color series now permits a uniform quotation of all color phenomena in internationally understood manner for all kinds of materials to be measured, by the simple determination of three color attributes.

In accordance with the invention, ultraviolet illumination of a sample can be combined with any other desired type of lighting for the test colors. It is possible to use diffuse daylight for the test colors and ultraviolet light for the sample, or standardized artificial light for the test colors and ultraviolet light for the sample. Those color differences, only caused by the differentiated distribution of spectral energy from an artificial light source, can be found in the following manner: one of the test colors is itself used as the sample and illuminated by the relevant artificial light source, while the same test color, which is found in the series fitted into the apparatus, is illuminated with diffuse daylight. In this way it is possible to express, without any conversion, the type and order of color differences, determined by impression and to express this in figures. This is true for all colors of the three-dimensional "color space" and for all light sources. So-called "evening colors," an expression used by the technicians for the appearance of colors in the light of conventional light bulbs, can be determined exactly in this manner.

With this true universality as regards choice of light sources, angle of illumination and observation, any conceivable kinds of goods can be subjected to measurement, and a numerical color determination effected with the aid of a single test color series. By satisfying these preconditions, a color determination method is achieved which can serve as an international standard.

In the drawings:

FIG. 16 shows a totally reflecting prism with a light dispersing cathetus surface as a light-deviating unit;

FIG. 17 shows a totally reflecting prism in which a cathetus surface is subdivided in steps;

FIG. 18 shows a totally reflecting prism, possessing a convex spherical cathetus surface;

FIG. 19 shows a totally reflecting prism having a hypotenuse surface which consists of three planes;

FIG. 20 shows a light-deviating unit, consisting of a reflecting surface and an absorbent plate;

FIG. 21 shows a light-deviating unit with an interposed collecting lens;

FIG. 22 represents an arrangement of test colors in transmitted light;

Figure 1:
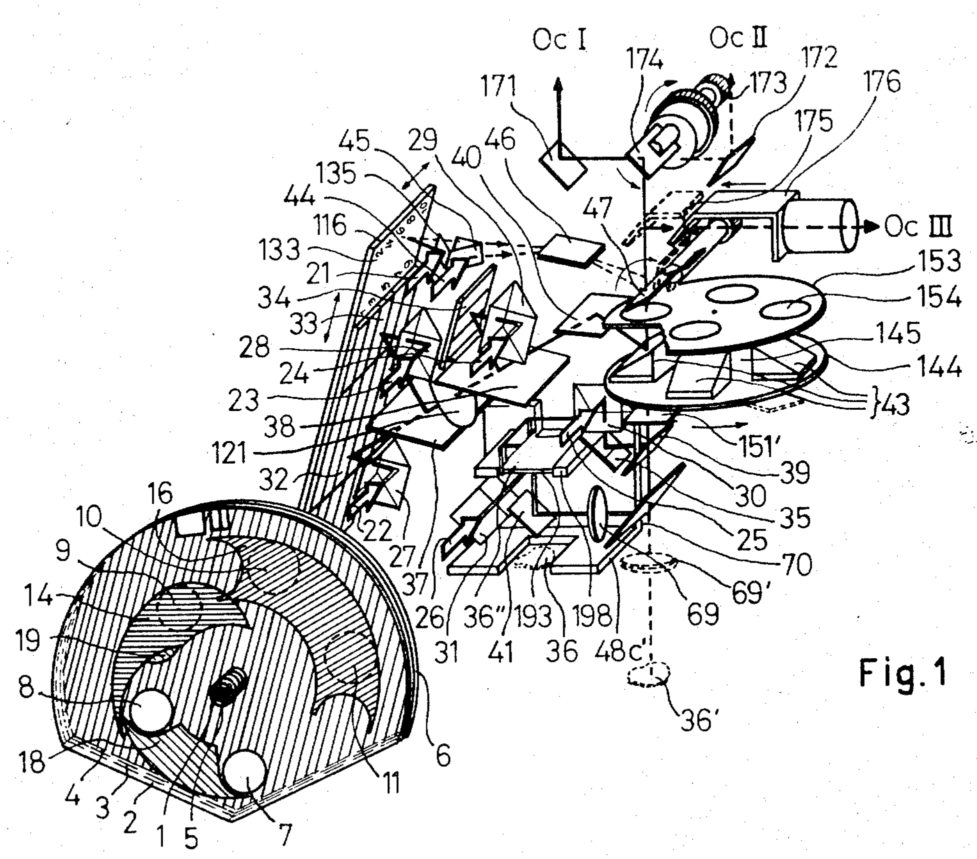
FIG. 1 is a perspective view showing schematically an apparatus for determining colors and color tolerances embodying the invention.
Figure 2:
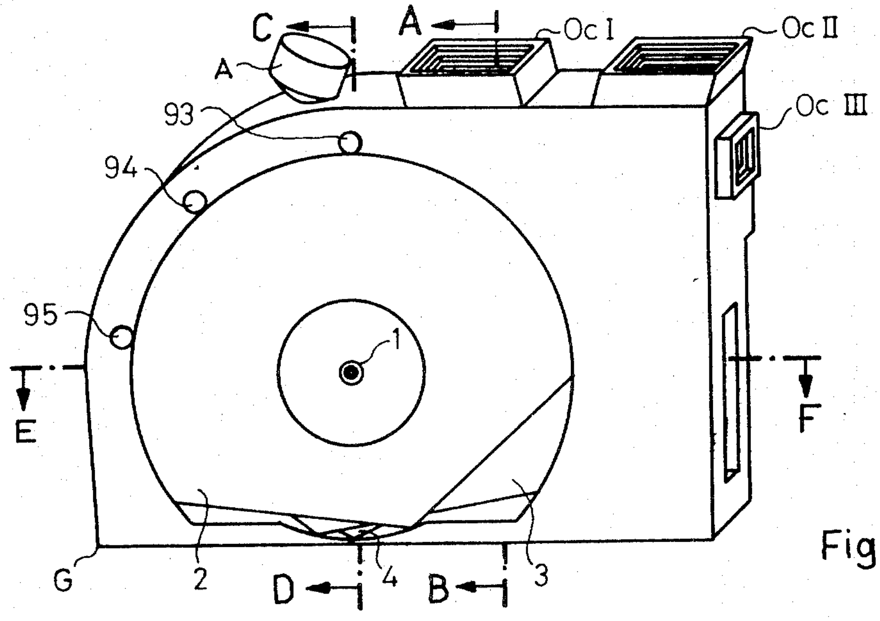
FIG. 2 is a view of a housing for the apparatus illustrated in FIG. 1.
Figures 26, 27, 28, 28A, 29:
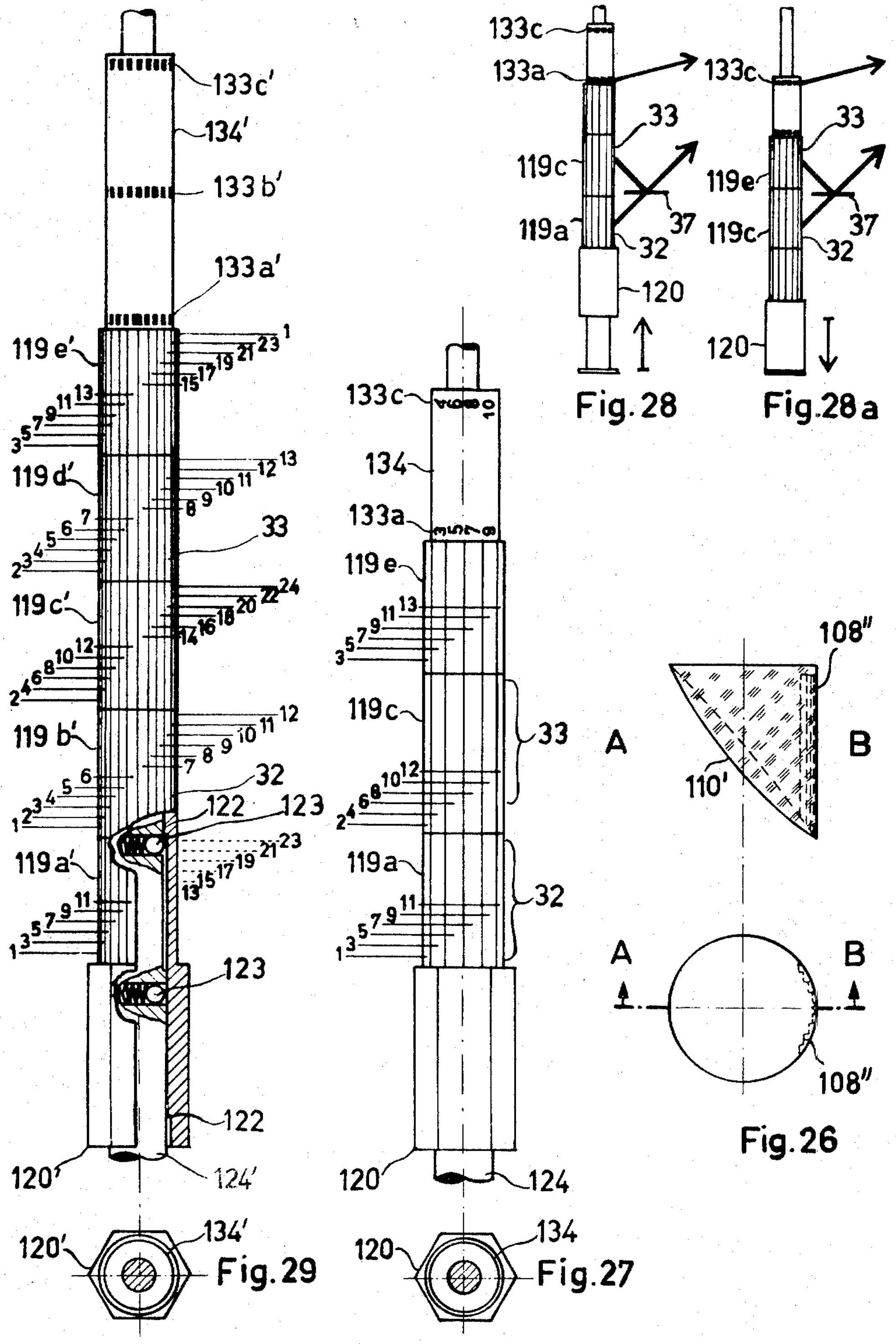
FIG. 26 shows a light-deviating unit similar to FIG. 23, viewed from above and in vertical section, the hypotenuse surface being formed as a concave mirror with totally reflecting effect.
FIG. 27 shows a rotatable and axially movable test color carrier for a constant interval of two hues.
Figure 34:
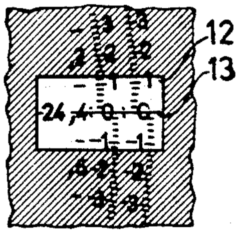
Figure 35:
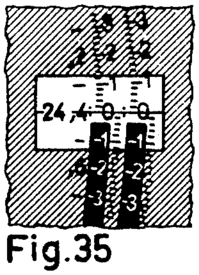
Figure 37:
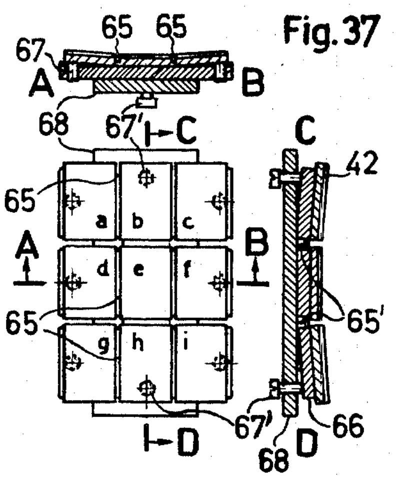
Figure 36:
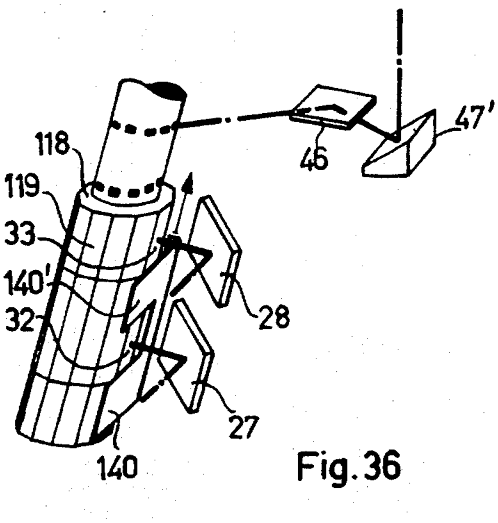
Figure 38:
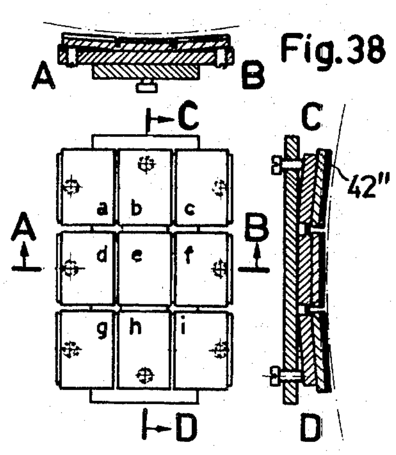
Figure 39:
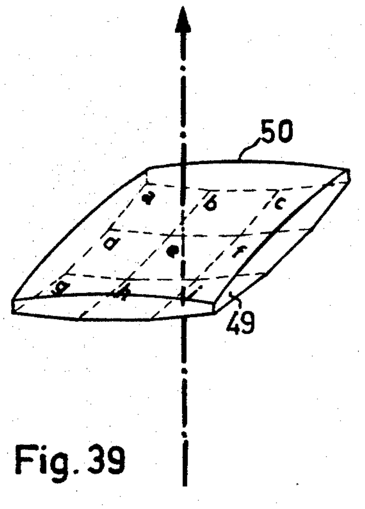
Figure 40:
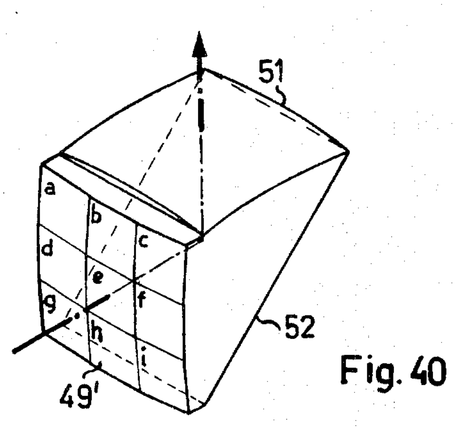
Figure 41:
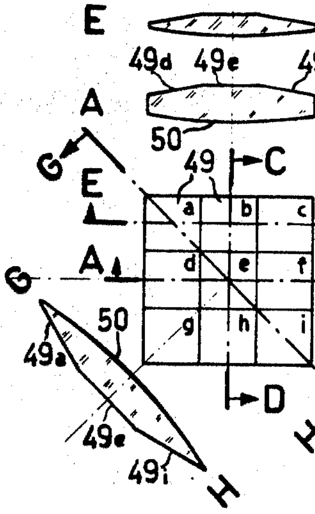
Figure 43:
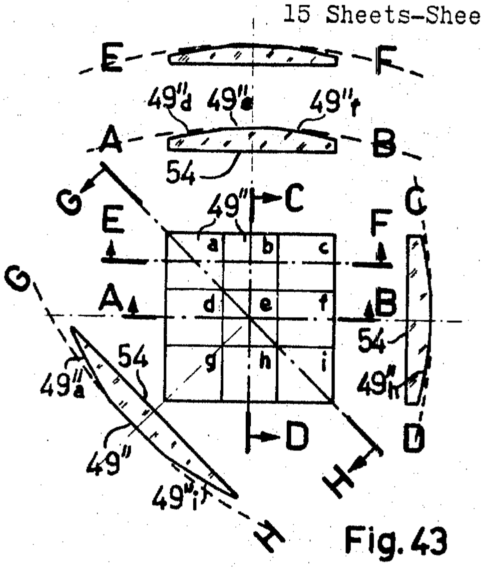
Figure 42:
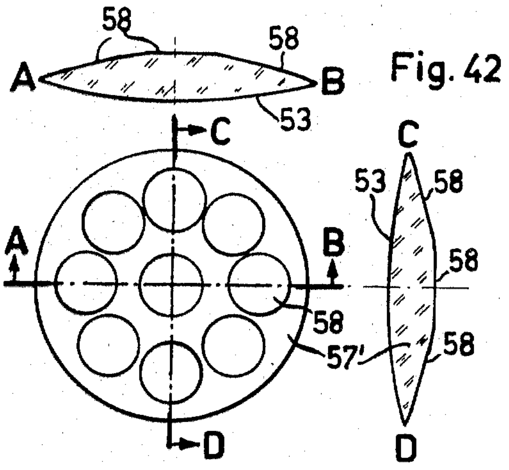
Figure 44:
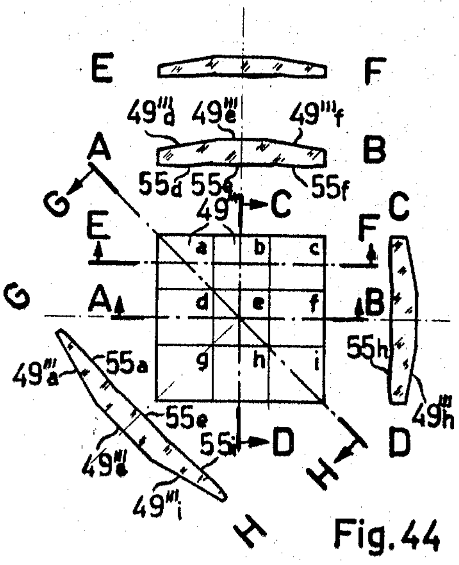
Figure 45:
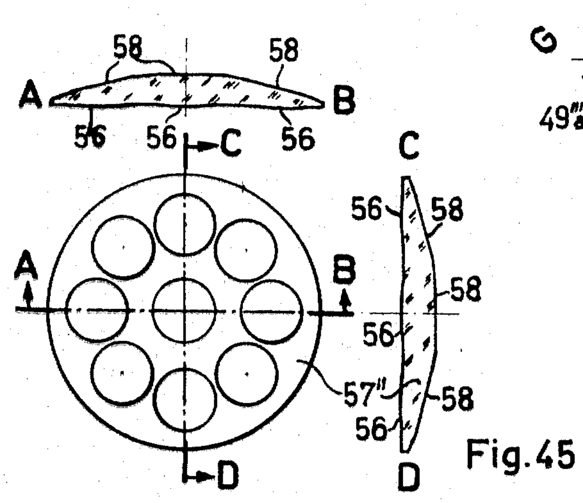
Figure 46:
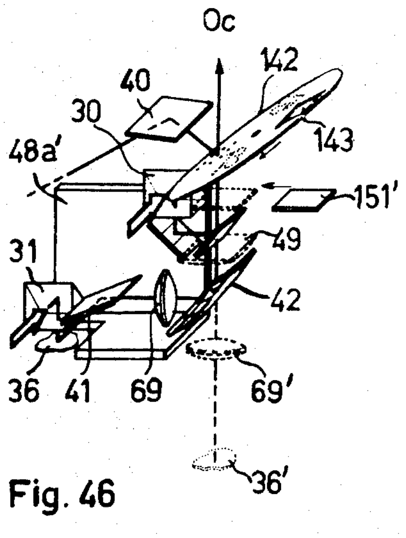
Figure 47:
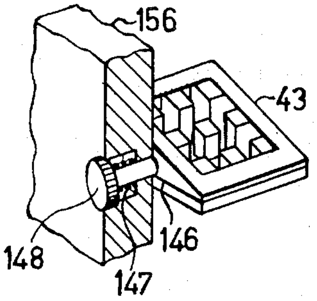
Figure 48:
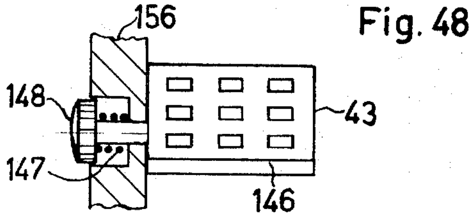
Figure 49:
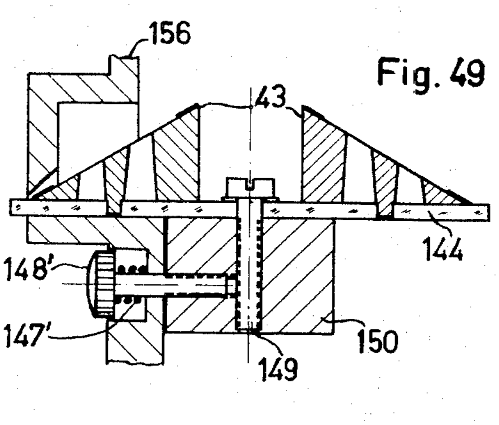
Figure 50:
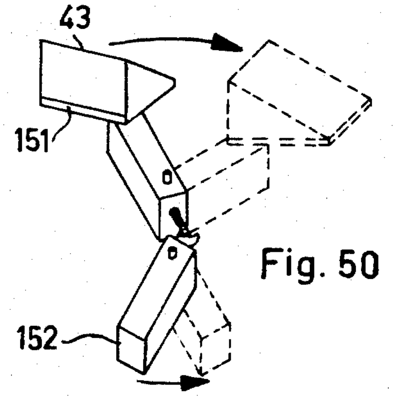
Figure 51:
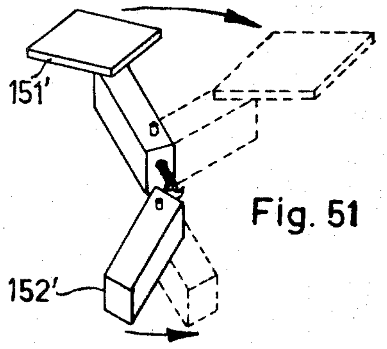
Figure 52:
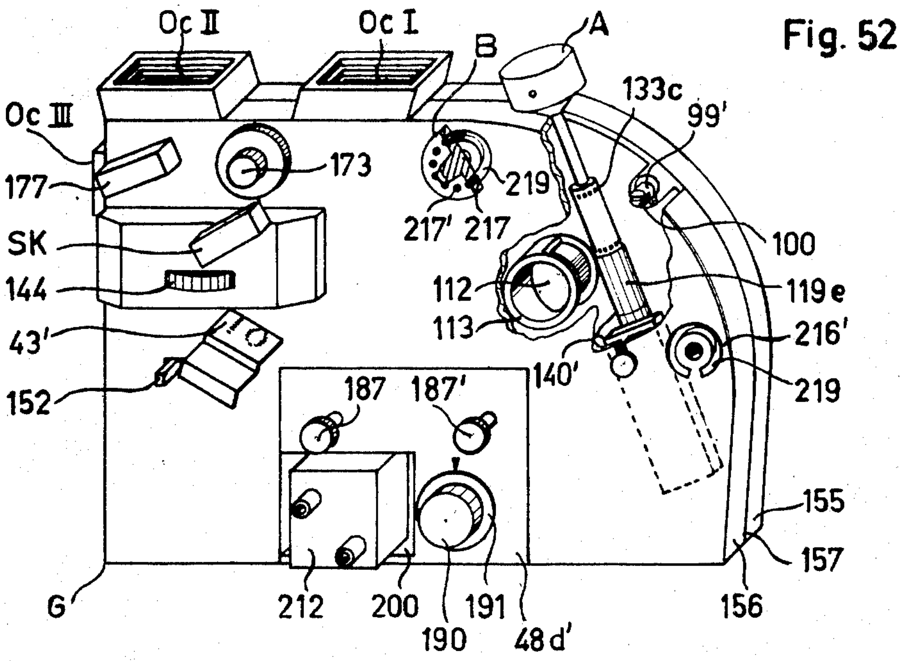
Figure 53:
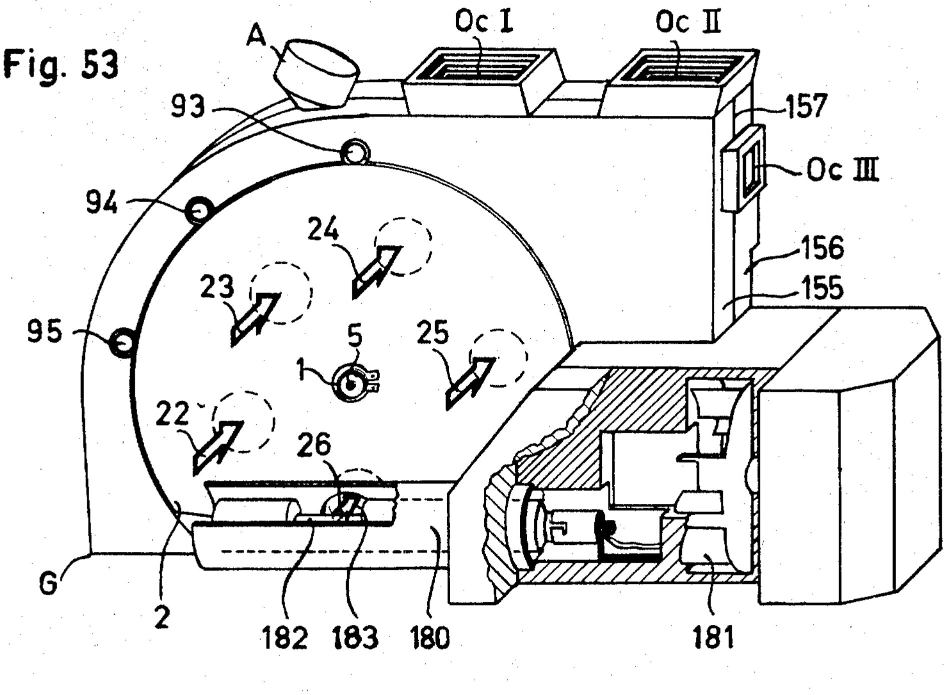
Figures 54, 55:
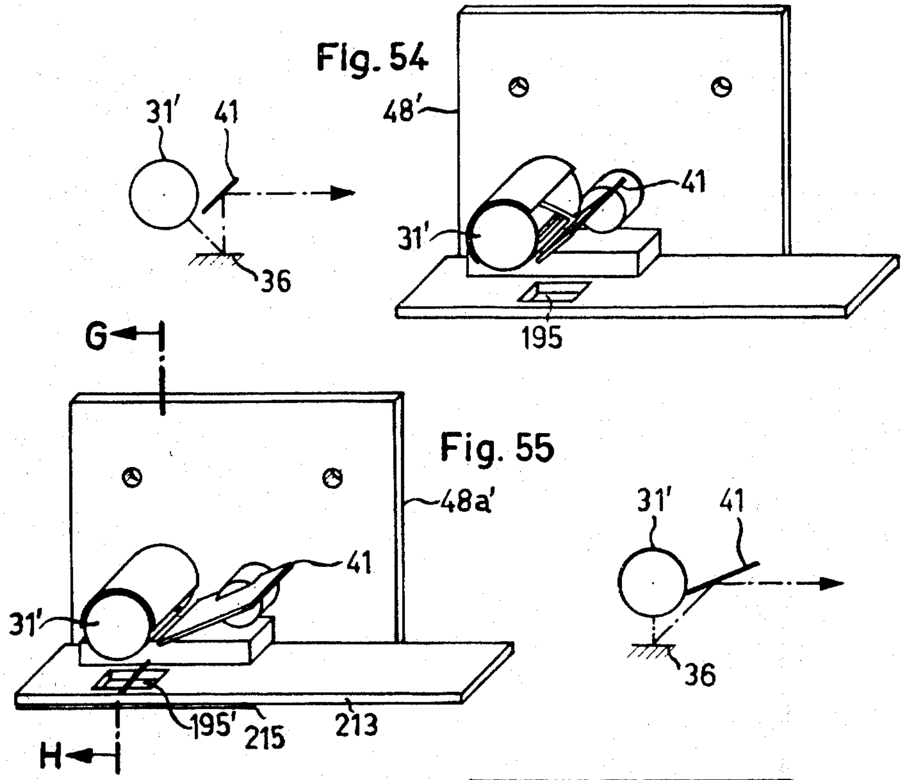
Figure 56:
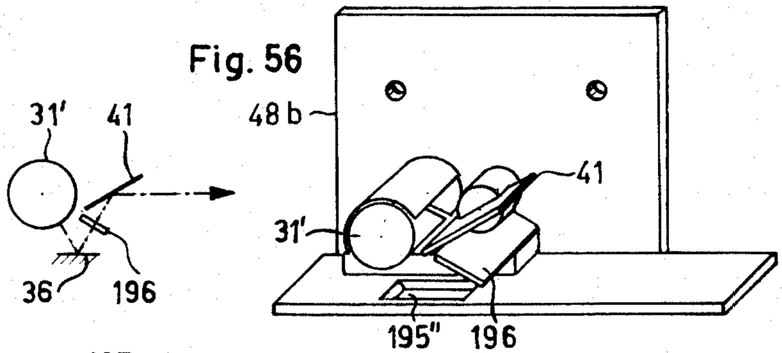
Figure 57:
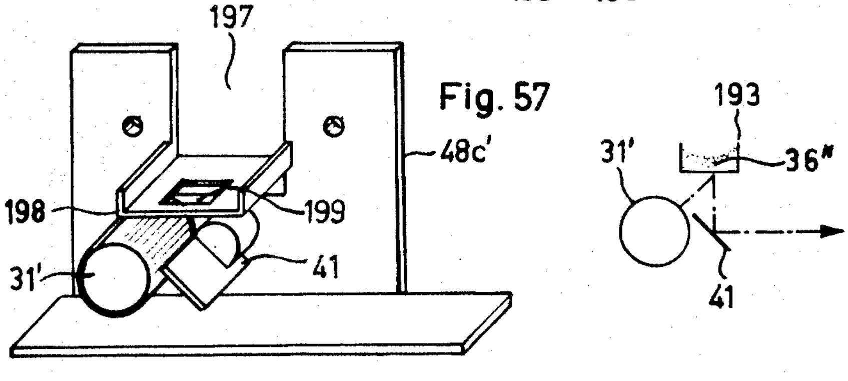
Figure 58:
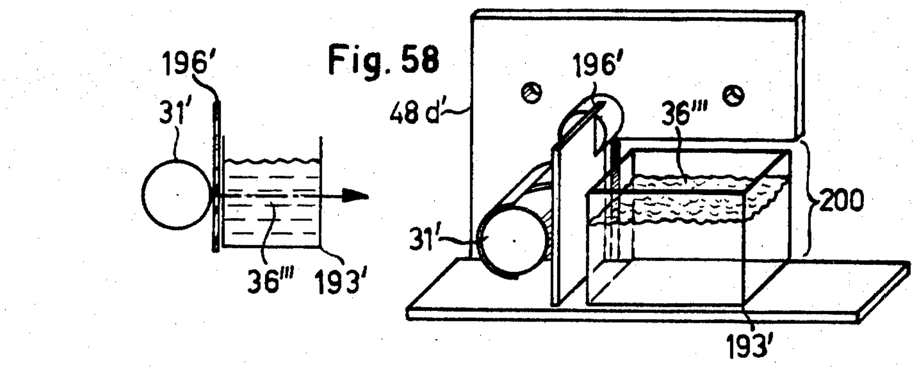
Figure 59:
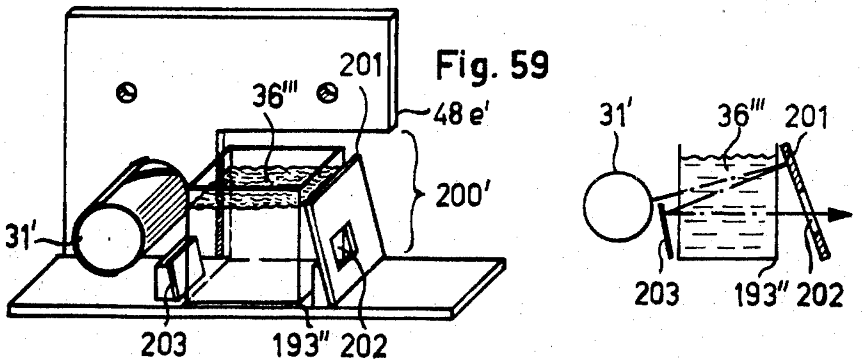
Figure 60:
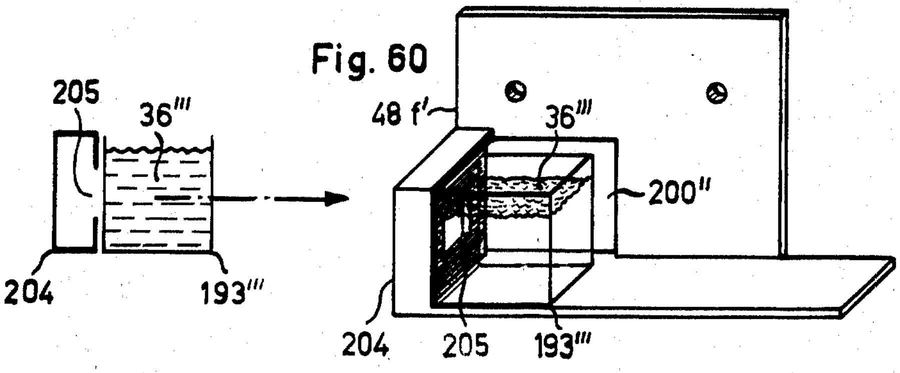
Figure 61:
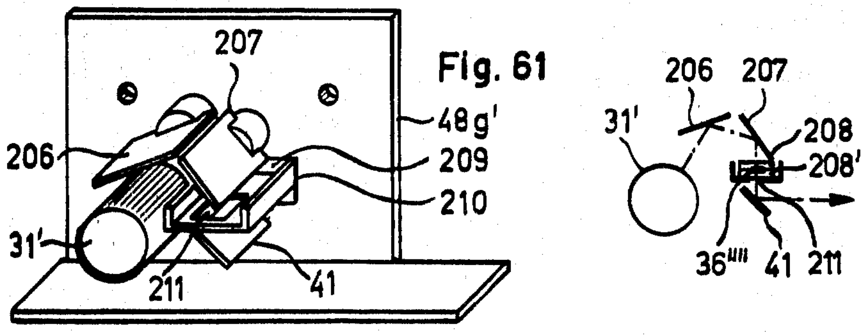
Figure 62:
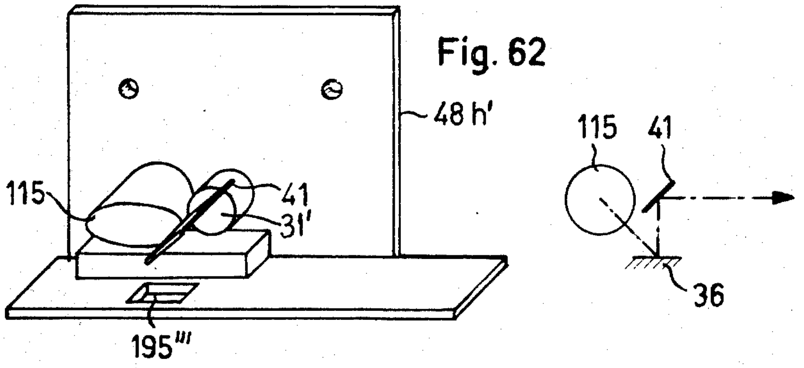
Figure 63:
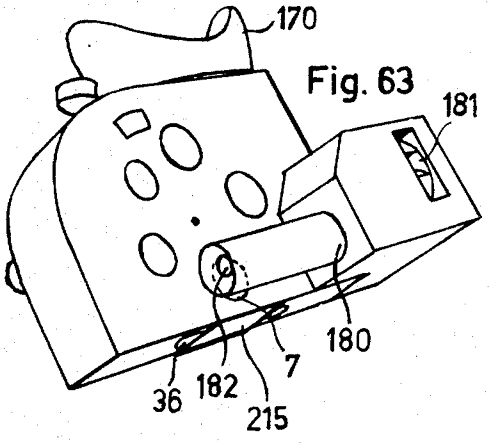
Figure 64:
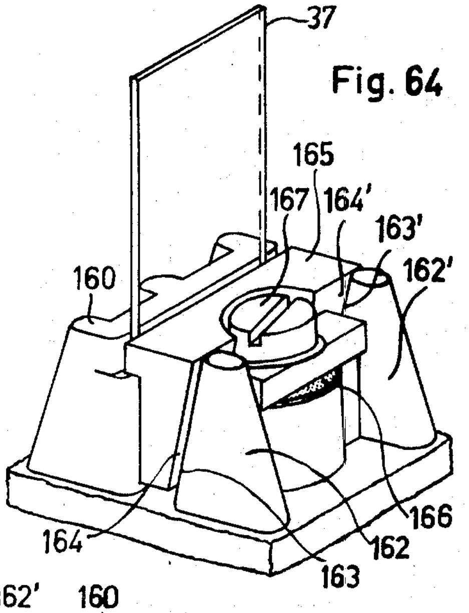
Figures 65, 66:
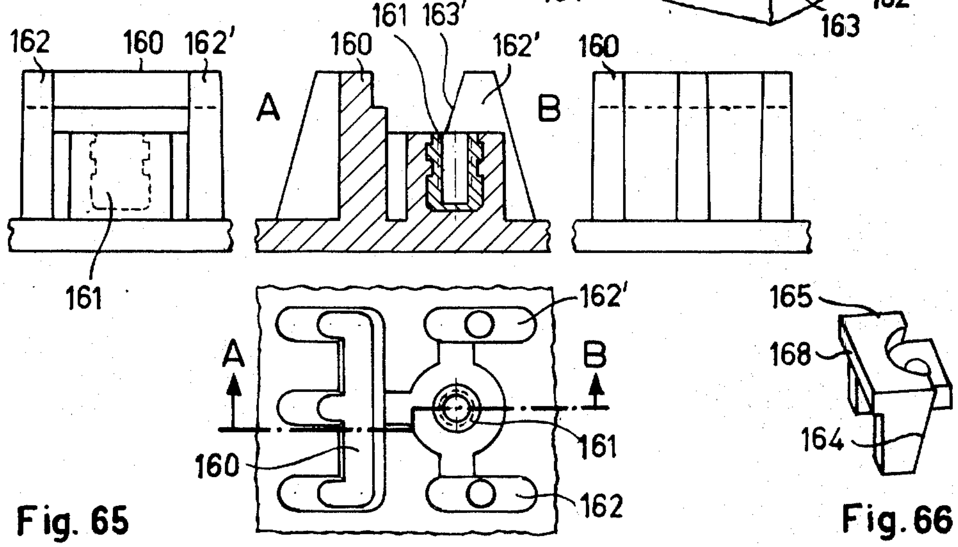

FIGS. 28 and 28*a* show the working position of the test color carrier of FIG. 27 before and after an axial shift by one ring width;

FIG. 29 shows a rotatable axially shiftable test color carrier for a change of the interval width from one hue to two hues, partly sectioned with two rests;

FIGS. 30 to 33 illustrate different forms of test color carriers;

FIG. 34 represents a scale showing the color attributes visible through the ocular;

FIG. 35 shows a variant of FIG. 34 with negative recording for the minus values on the scales;

FIG. 36 shows two white test color surfaces joined to a movable member in front of a test color carrier in a position corresponding to that shown in FIG. 1;

FIG. 37 shows in plan and in section one form of a light-deflecting element with multiple, individually adjustable, slightly inclined surfaces;

FIG. 38 shows in plan view and in section a light-deflecting element, similar to that of FIG. 37, and whose surfaces are curved (torically) in both directions;

FIG. 39 is a perspective view of a light-deflecting element with a curved surface;

FIG. 40 shows a light-deflecting element with a curved surface and in inclined plane surface;

FIG. 41 shows the light-deflecting element of FIG. 39 in a top plan view and four sections;

FIG. 42 represents in plan view and in section a round light-deflecting element with a curved surface;

FIG. 43 shows in top plan view and in section a light-deflecting element whose inclined surfaces are slightly curved;

FIG. 44 shows in top view and four sections a light-deflecting element whose inclined surfaces are each provided on their opposite sides with a convex surface;

FIG. 45 shows in top view and two sections a round light-deflecting element, whose inclined surfaces each have a convex surface on their opposite sides;

FIG. 46 shows an inclined disc, consisting of a plurality of discontinuous surfaces;

FIGS. 47 and 48 shows in diagonal view and front elevation respectively, a movable discontinuous surface;

FIG. 49 shows in section a horizontal movable disc with multiple discontinuous surfaces;

FIG. 50 shows a multiple discontinuous surface on an intermittently movable covering slide;

FIG. 51 shows an intermittently movable cover slide alone;

FIG. 52 shows the sectioned rear side of a housing with a replaceable insert piece;

FIG. 53 shows the housing of FIG. 2 fitted with a multisectioned ultraxiolet mantle, quartz burner, and cooling blower;

FIGS. 54 to 62 are sketches and perspective views of interchangeable insert pieces for the various types of samples;

FIG. 54 shows an arrangement for sample areas, which are illuminated under 45° and observed under 90°;

FIG. 55 represents an ararngement for sample areas, which are illuminated under 90° and observed under 45°;

FIG. 56 shows an arrangement for sample areas, which are illuminated under 60° and observed under 60° through a scattering element (determination of gloss);

FIG. 57 shows an arrangement for illumination under 45° upward and observation under 90° (powder determination), cf. FIG. 1;

FIG. 58 shows an arrangement for the illumination of a cell at 0° and observation at 0°;

FIG. 59 shows an arrangement for a three-time illumination of a cell;

FIG. 60 shows an insert piece for the determination of fluorescent colors;

FIG. 61 represents an arrangement for the vertical illumination of droplets on microscopy glass plates;

FIG. 62 represents an insert piece for the illumination of sample areas with light reflected from one surface, e.g. UV-light;

FIG. 63 shows a housing fitted with an ultraviolet cover, quartz burner and cooling blower;

FIG. 64 shows in enlarged diagonal view means for clamping an optical element;

FIGS. 65 and 66 are detail views of the means shown in FIG. 62.

The apparatus is essentialy composed of six main components namely:

(1) a mechanism constituted by diaphragm plates for controlling the magnitude of light admission into a housing;

(2) a viewing device having a field of vision;

(3) a device for controlling the direction of the illumination of a sample;

(4) a light deflecting device for transmitting the rays of a sample image towards the field of vision of the viewing device;

(5) a device for producing a plurality of color comparison images; and (6) a multiple discontinuous surface which is in the path of the sample images and the color comparison images for passing said images to the viewing device to produce in the field of vision thereof a simultaneous field of said images.

In my previous application, referred to hereinbefore, there have been shown a number of such simultaneous viewing fields, and an explanation of the manner in which color evaluation of a sample is effected by comparison with the produced color comparison regions.

With this background, the present invention will next be described in detail, referring to the drawings: 1 refers to a shaft on which are rotatably mounted diaphragm plates 2, 3 and 4, and having a bore 5. An immovable diaphragm plate 6, situated behind the movable diaphragm plates 2, 3 and 4, is provided with transparent areas 7, 8, 9, 10 and 11, as well as a reading window 12 (FIG. 10) with the reading mark 13. Diaphragm plate 2 is provided with an opaque area 14 and an associated scale 15.

Diaphragm plate 3 is provided with an opaque area 16 and associated scale 17; diaphragm plate 4 has two opaque areas 18 and 19. Arrows 21 to 26 in FIG. 1 show the light entry directions, while the light-deviating units are designated 27 to 31.

Light from deviating units 27, 28 illuminate chromatic test color surfaces 32, 33. Light from deviating units 29, 30 illuminate neutral-gray test color surfaces 34, 35, and light from deviating unit 31 illuminate sample 36. A set of glass plates 37 is situated between the test color surfaces 32 and 33 for combination of the rays thereof. A set of glass plates 38 associated with test color surface 34 serves for combining the rays from surface 34 with the combined rays from glass plates 37. A set of glass plates 39 is associated with test color surface 35 for combining the rays therefore with the rays from sample 36. A mirror 40 reflects the image from glass plates 38 to one of a plurality of usable multiple discontinuous elements 43. A mirror 41 reflects the sample image towards a light deflecting element 42 which produces a multiple number of sample images and deflects such images to glass plates 39 for combination with the image therefrom, after which the combined image passes to element 43. The sample image and the image from the test color surfaces pass through element 43 and are applied in the field of vision of ocular I, and/or ocular II, to produce a simultaneous field of vision containing the sample image and a plurality of color comparison regions as produced from the test color surfaces.

Figure 8:
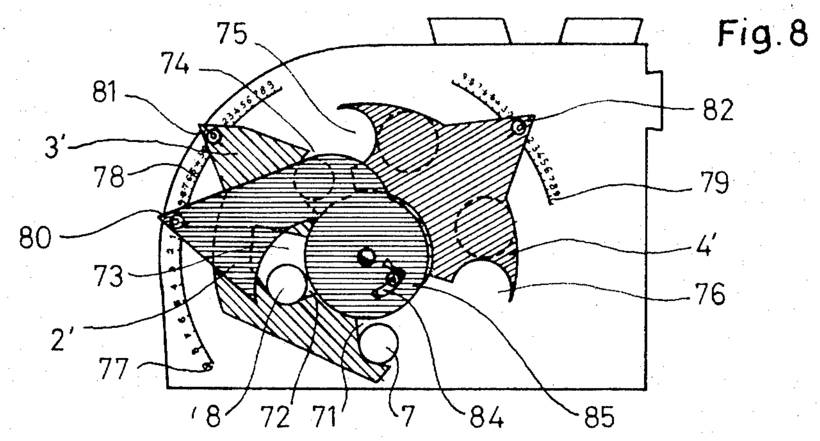
FIG. 8 shows a front view of a device with diaphragm plates of opaque material.
Figure 9:
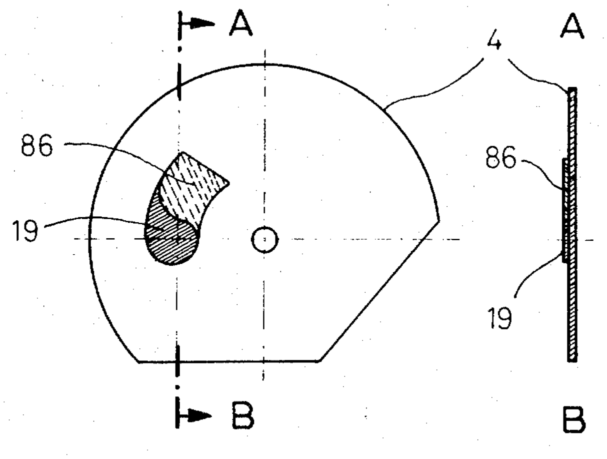
FIG. 9 shows a diaphragm plate of transparent material with an opaque area, together with a color foil in view from above and section.

Diaphragm plates 2', 3', 4' (FIG. 8) are produced from unbreakable material which is opaque, e.g. from extrudable or pressable plastics. Transparent areas are formed by recesses 71, 72, 73, 74, 75 and 76, scale parts 77, 78, 79 being provided at the edge areas, these parts being formed of a single piece. Ear-shaped grips 80, 81, 82 are provided on the diaphragm plates for manipulating them. The diaphragm plates sometimes have to be set for certain values for longer periods of time, as for example, in production quality control. The diaphragm plates may be locked, therefore, against unintentional movement, by means of a clamping screws 85 extending through a slot 84. Such diaphragm plates, made of plastic material, are more suited to rough use than glass plates, which also show light losses due to absorption and surface reflection. Plastic material plates are advantageous wherever the transparent areas are intended to be colorless.

Where color is required, at transparent areas, glass plates are more suitable. According to the purpose for which the apparatus is to be used, e.g. for adaptation to a tricolor system, it is advisable to provide color foils (filter foils) at the transparent areas, such as the foil 86 (FIG. 9), for the transparent areas associated with the test color ray path, while within the range of the transparent areas of the sample ray path, no filters are provided.

Figure 10:
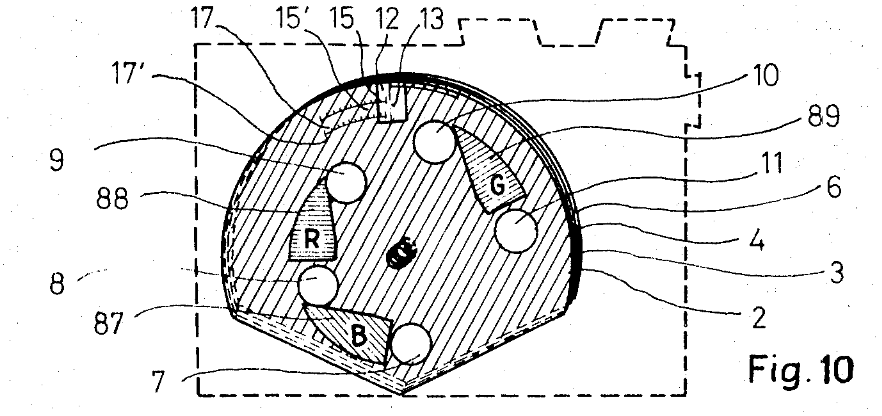
FIG. 10 shows diaphragm plates of transparent material, whose opaque areas are provided by foil material.
Figure 11:
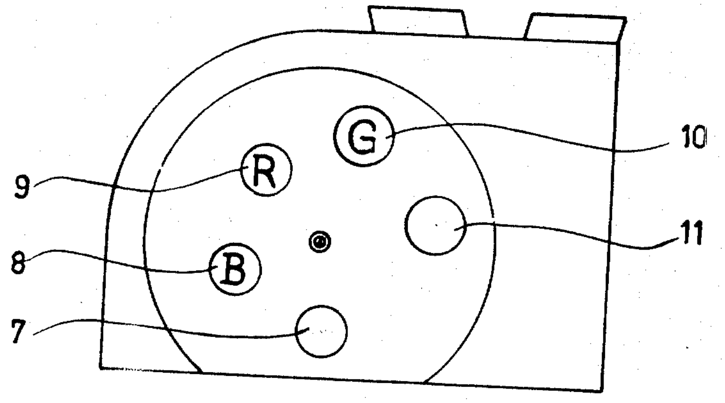
FIG. 11 shows a diaphragm plate assembly fitted with color filters.
Figure 25:
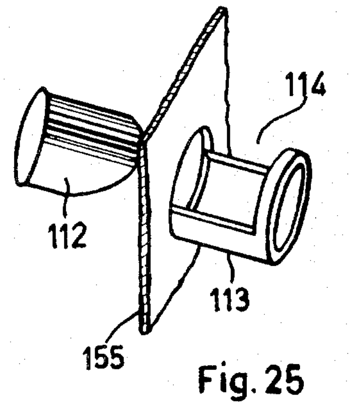
FIG. 25 shows the cylindrical light-deviating unit of FIG. 23, together with a hollow cylindrical centering guide which forms a section of the housing.

Colored light regulation, by means of filter zones on the diaphragm plates, for instance, for additive color mixtures, can also be achieved by providing on diaphragm plates made of glass, with suitably cut, for example, wedge shaped filter foil material, such as shown at 87, 88, 89, in FIG. 10, which successively act as a covering during movement of the diaphragm plates, thus allowing the regulation of the passage of light with respect to its chromatic composition between white and a pure color.

Where three basic colors are to be used, the apparatus may be adapted for that purpose by providing three light-deviating units with a color filter in the associated housing openings (see FIG. 11). In such case, the light-deviating units can also consist entirely of the filter material, e.g. colored glass, so that only a single unit part need be fitted for each housing opening (FIG. 25). In the cases mentioned, it is then possible to use diaphragm plates of glass, as well as of plastic material. If, e.g., tricolor apparatus is to be outfitted with movable diaphragm plates which are fixable, it will be advantageous to use plastic diaphragm plates together with light-deviating units of filter material.

For purposes of psychological experimentation, e.g., color sense and contrast studies, it is sometimes advantageous that the tested person who makes the settings on the apparatus, should not obtain from the amount of movement of, for example, the knobs on the apparatus, information about the extent of color change obtained by the setting. If the transparent areas 7, 8, 9, 10 and 11 on the immovable diaphragm plates 6 and the different opaque or colored areas 14, 16, 18 and 19 of FIGS. 1, 8, 10, 11 and 13, are of irregular shape, but mutually compatible as regards size and form, by uniform movement of each diaphragm plate it is possible to adjust the light for each of the transparent areas at will, e.g. by variable changing of the intensity, increasing it, decreasing it, and again increasing it. The tested person will continue turning the knob in the same direction, believing that thereby there has been an equal gain in red. However, this is not in fact the case, but there can follow, e.g. a slight increase, then again a decrease, so that the tested person is only able to judge according to the color impression actually seen and must make his settings accordingly. Suitably, in connection with this, the scale values used will not be the values found in the calibration of the device, but a continual series of numbers. The numbers combination read off for each setting is later converted to the actual calibration values with the aid of tables. In my copending application, Ser. No. 262,985, it was noted that the transparent areas of the immovable diaphragm plate are covered by the opaque areas of the movable diaphragm plates. If every movement of a setting knob produced a change of the diaphragm size proportional to the extent of movement, this would be of little practical use, as it is important to follow the sensitivity response of the apparatus of human vision (eye and brain). It has been found in this connection, that it is advantageous not to leave the light entry openings of the housing or the light-deviating units themselves, free over their entire area. In the apparatus of the invention, provision is made for permitting the opaque areas of the diaphragm plates 2, 3, 4 and 6 to project into the ray path in the shape of figures, peaks, needles, hatchings, dots, etc. (FIG. 12), whereby uniform movement of the diaphragm plates results in progressive alteration of the entering light.

Figure 3:
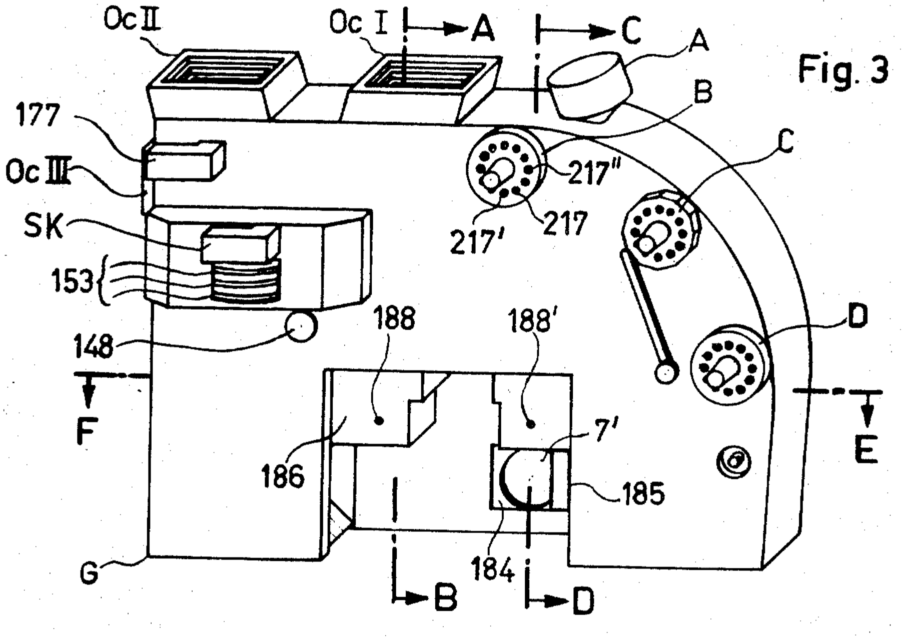
FIG. 3 shows the housing of FIG. 2 from the rear.

The movable diaphragm plates 2, 3, and 4 are moved along planes parallel to each other, by a gearing consisting of friction wheels 93, 94, 95 (FIG. 2). Preferably, centrally mounted diaphragm plates are formed in such a manner that two segments are left out, so that their common shaft 1 can be located nearer to the bottom surface of the housing, an arrangement of possible advantage. The bore 5 in the shaft 1 serves to center the apparatus on a light source. The friction wheels 93, 94, 95, which rest on the periphery of the movable diaphragm plates 2, 3, and 4 respectively, are mounted on shafts 99 which also carry the manual setting knobs B, C, D respectively (FIG. 3). The friction wheels are located in the front half of the housing, the manual setting knobs in the rear half. The strength of pressure spring 101 is suitably set by means of known type of grip-rings 102. When the casing is closed, the manual setting knobs B, C and D respectively, spring back and after a short turn again rest with the pivots 99 on the division surface 100.

Figure 14:
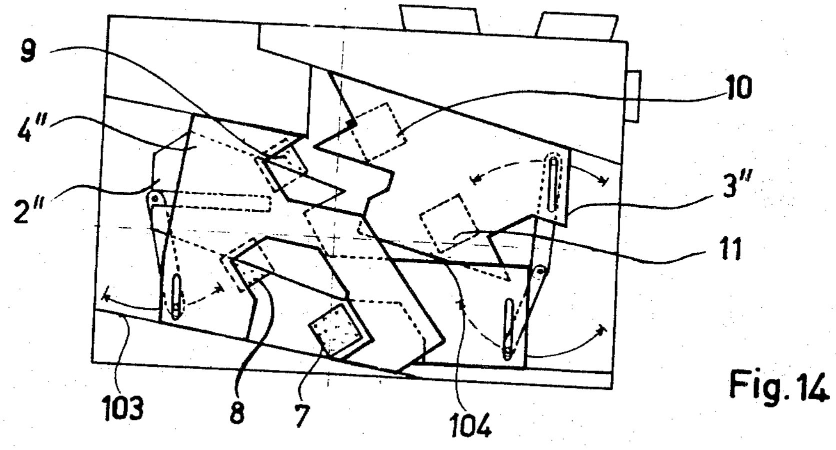
FIG. 14 illustrates opaque plates movable in various inclined planes.

In another embodiment illustrated in FIG. 14, the diaphragm plates 2, 3, 4 are replaced by rectangular plates 2'', 3'' and 4'', which are movable sideways and parallel to one another in guideways 103, 104 of different inclination for the different diaphragm plates 2'', 3'', 4''.

Figure 12:
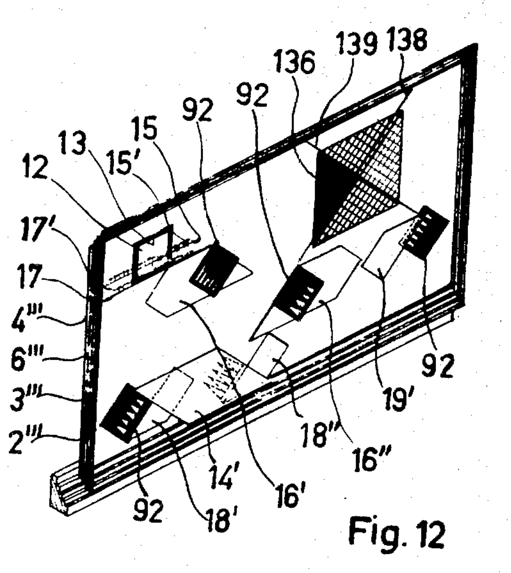
FIG. 12 is a perspective view of rectangular diaphragm plates of glass with opaque areas.

Where, instead of round glass plates, rectangular glass plates 2''', 3''', 4''' are being used as movable diaphragm plates, because they are advantageous from a production point of view, these can be guided along slideways, as shown in FIG. 12.

The setting knobs B, C and D can be connected with small gear wheels adapted to cooperate with teeth along the peripheries of the diaphragm plates if these are made of extrudable or pressable material. If the manual setting knobs B, C and D are also teethed, the jerky movement known in mechanics can also be used for the diaphragm plates, e.g. by means of push buttons and toggles. For some applications of the methods described here it may be advantageous if, instead of a continuous movement, the diaphragm plates are simply moved back and forth in accordance with the desired tolerance width by finger movements.

In my previously mentioned copending application there was described a light-deviating unit using the diffuse reflection of flat or dull materials for light deviation. Such light deviating units are employed for redirecting the incoming rays of light passing the diaphragm plates onto the test color surfaces and the sample. In accordance with the present invention, the light-deviating units are now fitted not only with dispersing surfaces, but additionally with reflecting or with specular surfaces. A specular surface 105 (FIG. 15) is combined with a focusing screen or opal glass plate 106 as a dispersing element. This enables the device also to be used under poor light conditions.

Figure 16:
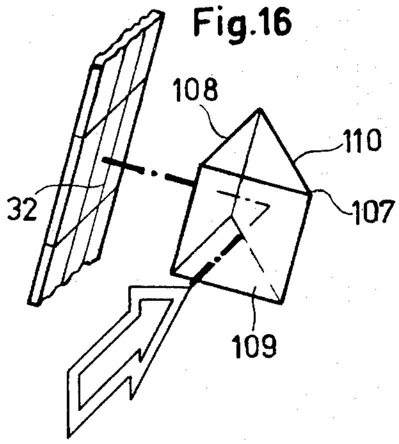

Further according to the invention, the reflecting or specular surface 105 and the focusing screen 106 form a single prism-shaped body 107 whose one cathetus surface 108 is made of mat construction and effective to diffuse light reflection (FIG. 16).

Figure 17:
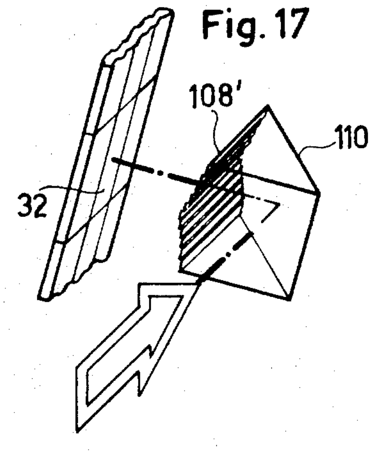

The mat cathetus surface 108' shown in FIG. 17, can be provided with steps or ridges so that the ray path is dispersed.

Figure 18:
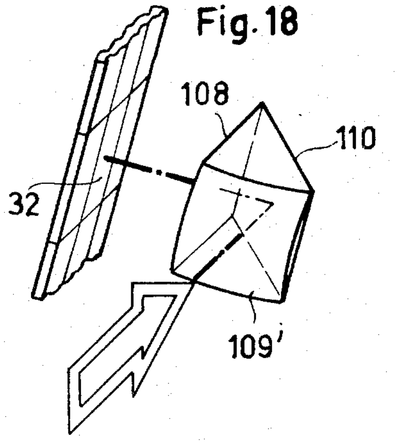
Figure 19:
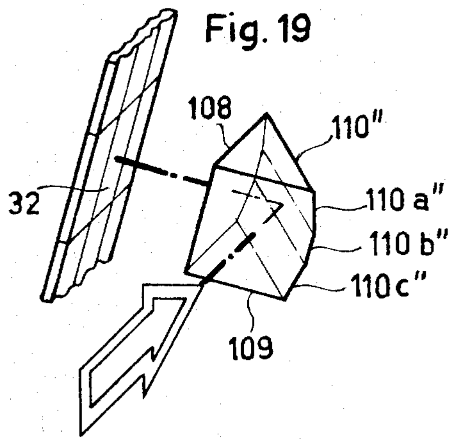

According to the present invention, one of the prismatic surfaces of the light-deviating unit, e.g. the cathetus surface 109' (FIG. 18), or the hypotenuse surface 110' (FIG. 26) is convex. In FIG. 26 this forms an inclined concave mirror with totally reflecting effect, which does not necessarily have to receive a specular surface, for this reason. It is also very suitable to divide the hypotenuse surface 110'' (FIG. 19) into three planes 110*a''*, 110*b''*, 110*c''*, which are slightly inclined towards each other, to direct the light from the edge zones towards the center of the point of light exit.

The light deviating unit which controls the illumination of a sample is of special construction to permit adjustment of the angle of illumination of the sample, as will be described more fully later. This light deviating unit is preferably of cylindrical shape for reasons which will become apparent later. For securing light-deviating units in the shape of cylindrical prisms and for guiding the light while avoiding disturbing reflections or stray light, the invention provides hollow cylindrical centering or adjustment guides 113 (FIG. 25) which, preferably, are integral with a front portion of the housing, with a side opening 114 for light exit. The cylindrical form of the said centering or adjustment guide makes it possible to construct a light-deviating unit capable of turning about an axis parallel to the direction in which light enters.

Different possibilities exist for the colored lighting of the sample 36. Referring to FIG. 62, its light-deviating unit 31' which ordinarily is provided with a reflector surface of diffuse, scattering material, can instead be provided with an opaque colored surface 115, such as an intensive, pure hue. When lighting the sample 36 with ultraviolet light, the surface 115 of light-deviating unit 31' is a reflecting surface of pure aluminum, which has suitably been dulled, as by etching or sandblasting.

Figure 15:
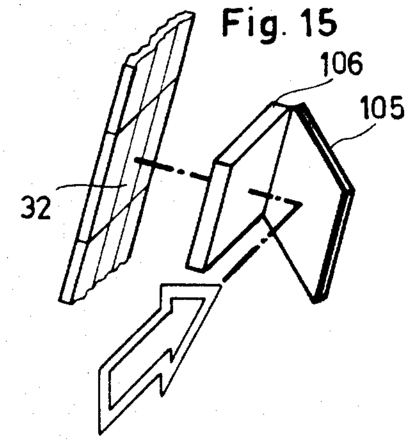
FIGS. 15 to 22 are enlarged views of parts of the apparatus shown in FIG. 1.
Figure 20:
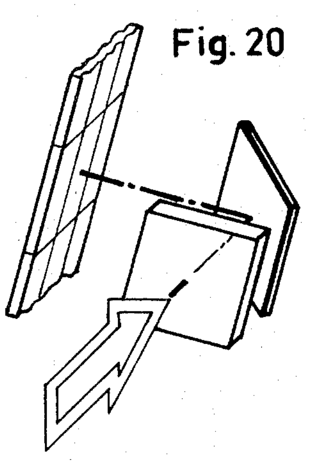
Figure 21:
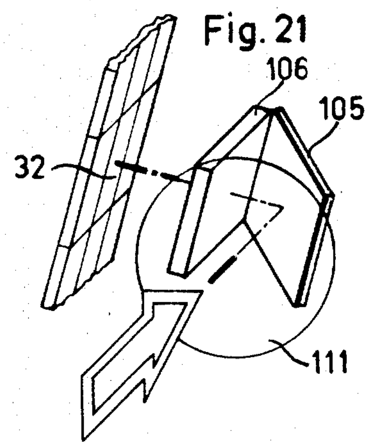

It is also possible to make one of the reflecting elements 105, 106 of a light-deviating unit 31' from a material with selective effect, e.g. from filter glass (FIGS. 15, 20, 21). The entire cylindrical body 112 can similarly be made of treated filter glass (FIGS. 23 to 60). In each of the cases mentioned, the sample 36 is illuminated with colored light, preferably with complementary colors to the color of the sample, whereby with different samples, colored with the same color, but with different intensity and showing only slight saturation differences, these differences will be made more clear by the complementary color lighting. For the illumination of the sample 36 with ultraviolet light, the cylindrical body 112 will suitably be made from processed quartz glass.

For determining colors and color tolerances with the device disclosed in my previously cited copending application, it is necessary to utilize test color surfaces in the form of plates which are inserted into the device in the manner of photographic slides. In accordance with the present invention, it is now possible to house in the apparatus constantly an entire series of test colors protected against the influence of light and dust. The test colors can be operated comfortably in continuous sequence together with a common setting piece. The following conditions must be met for the suitable arrangement of the test colors: each single test color surface must be visible at the same time as that test color surface carrying the next higher hue number, so as to allow those two surfaces to be superimposed optically, whereby they are seen mixed as intermediate colors (decimal stages of the hue scale). Apart from this, at both sides of each test color surface, the neighboring colors from the relevant color system are to be visible concurrently, as this is required for a simultaneous field of vision. For some determinations, either the directly adjacent test colors, with one hue stage difference or two more remote test colors, e.g. with two huge stages difference (at both sides, therefore with four hue stages difference altogether), are to be visible alternately, possibly in rapid alternation with nearer lying adjacent colors. Thus there results the following necessary arrangement for the chromatic test color surface 32.

EXAMPLE I

Basic position (a single hue stage difference to the left and the right).

hue stage 2
hue stage 3
hue stage 4

For the optical superimposition for the intermediate colors 2.1 to 2.9, 3.1 to 3.9 and 4.1 to 4.9 always the next higher hue stages must be available on the (second) chromatic test color surface 33.

EXAMPLE II

| Test color surfaces **32** | Text color surface **33** |
|---|---|
| hue stage **2** | hue stage **3** |
| hue stage **3** | hue stage **4** |
| hue stage **4** | hue stage **5** |

EXAMPLE III

Hue stage interval increased to two hue stages each as compared with Example I:

Test color surface 32
hue stage 1
hue stage 3
hue stage 5

Basic hue stage 3 has been maintained in the center and analogous to Example II there results for an optical superimposition for the intermediate colors 1.1 to 1.9, 3.1 to 3.9 and 5.1 to 5.9 the necessity of arranging the following hue stages on the (second) chromatic test color surface 33.

EXAMPLE IV

| Test color surface **32** | Test color surface **33** |
|---|---|
| hue stage **1** | hue stage **2** |
| hue stage **3** | hue stage **4** |
| hue stage **5** | hue stage **6** |

As can be seen according to the size of the superimposed area, the hue stages 1 and 2 can be blended into decimal fractions 1.1, 1.2, 1.3, 1.4, 1.5, 1.6, 1.7, 1.8, 1.9 and in the same manner the hue stages 3 and 4 to 3.1 up can be blended from 3.9, and the huge stage 5 and 6 can be blended into intermediate colors 5.1 to 5.9.

The practical arrangement of the test colors, e.g. 1 to 24 of a known color which is realizing Example II is relatively simple. The colors are ordered in the sequence of the hue stage numbers in the form of strips next to one another on a common carrier 116 (FIG. 1). An arrangement on one plane or along a band 117 (FIG. 30) is advantageous. Prismatic carriers 118 (FIG. 36) can also be fitted with test color strips in the form of colored rings 119.

The need for an interval of two hue stages however complicates the arrangement. In accordance with the invention this is achieved by a special arrangement of the test color lengths, by a change of sequence and a systematic shifting of the test colors of the test color area 33 with respect to the test color area 32. The arrangement for an interval of two hue stages each is shown in Example V:

EXAMPLE V

| Test color surface 32 | Test color surface 33 | |
|---|---|---|
| Hue stage 1 | Hue stage 2 | (Hue stage 3). |
| Hue stage 3 | Hue stage 4 | (Hue stage 5). |
| Hue stage 5 | Hue stage 6 | (Hue stage 7). |

On the basis of Example V the test colors are shifted parallel jointly, in such a way that the hue stages 1, 3 and 5 serving as test color area 32 are removed from the working area. The hue stages 2, 4 and 6 used as test color area 33 are therefore moved into the place of the test color area 32, while the hue stages 3, 5 and 7, hitherto positioned outside both working areas to the right, is now moved to the working area, in place of test color area 33. Example VI shows the changed situation after the parallel shift:

EXAMPLE VI

| | Test color surface 32 | Test color surface 33 |
|---|---|---|
| (Hue stage 1) | Hue stage 2 | Hue stage 3. |
| (Hue stage 3) | Hue stage 4 | Hue stage 5. |
| (Hue stage 5) | Hue stage 6 | Hue stage 7. |

For carrying out the above described operation, a cylindrical carrier 120 is advantageously chosen, which is turnable and can be shifted axially at the same time (FIGS. 28 and 28*a*). The test colors are arranged as parallel and axially extending strips and form rings around the circumference of the carrier. A constant interval of two hue stages according to Examples III to VI, is provided by an arrangement whereby a test color ring **119*a*, which has all the odd numbers of the hue stages is followed by a second somewhat broader ring 119*c* having the missing even numbers,. The second ring 119*c* is followed by a third ring 119*e*—similar to the first ring 119*a*—this third ring 119*e*** being however turned by the width of a test color strip (FIG. 27).

If the different hue stages of a 24 parts color circle are to be set one after the other as the central color of the color surface 32 (and thereby as the central color comparison field of a simultaneous field of vision), the following procedure becomes necessary for the test color carrier 120:

basic position hue stage 1—upper position of the test color carrier 120 (FIG. 28)
change from hue stage 1 to 2—axial shift (FIG. 28*a*)
change from hue stage 2 to 3—axial shift back (FIG. 28) and turn of the carrier by one hue stage
change of the hue stage 3 to 4—axial shift (FIG. 28*a*)
change from hue stage 4 to 5—axial shift back (FIG. 28) and turn of the carrier by one hue stage etc.

The arrangement is further complicated considerably, as soon as a quick change of interval width from one to two hue stages or vice versa is demanded. For this purpose five test color rings **119*a*′ to 119*e*′ are arranged side by side (FIG. 29). The circumference of the test color carrier 120′ now has to carry a double number of test color strips, so that the strips are only half as wide. With a lens 121 in the test color ray path (FIG. 1) it is possible to make the test colors visible in the simultaneous field of vision to the same extent as with the use of double stage intervals. The axial shift is also correspondingly increased. The sequence of the different hue stages can be seen from FIG. 29. The first (lowest) test color ring 119*a*′ consists, just as with the double stage interval according to Example V, of the 12 odd numbers of the hue stages, there being, however, two such sets needed, so as to close the 24 part ring. In FIGS. 27 and 29 only the test colors of the visible upper carrier half are designated. Adjacent to the first ring 119*a*′ there now follows a ring 119*b*′ with all 24 colors in normal, continuous sequence (1, 2, 3, 4, 5, 6, 7, 8, 9 to 24). The third ring 119*c*′—the center one—consists of the even hue stage numbers 2, 4, 6, 8, 10 etc. up to 24 and a repetition of hue stages 2, 4, 6, 8, etc. up to 24 (because, as mentioned, a double set is needed, so as to close the 24 part ring). The fourth ring 119*d*′ again consists of all 24 colors in normal continuous sequence, but this fourth ring 119*d*′—has seen analogously from Example II—is turned one hue stage as compared with the second ring 119*b*′. The fifth (topmost) ring 119*e*′ has exactly the same chromatic composition as the first ring 119*a*′, but has been turned one hue stage in comparison with the first ring 119*a*′**, as can be noted from Example V.

For the five color rings **119*a*′ to 119*e*′ three settings of the carrier 120′** are possible: the setting shown schematically in FIGS. 28 and 28*a* according to Examples V and VI, as well as an intermediate setting in which the test color rings **119*b*′ and 119*d*′ are used in normal color sequence without any axial shift. The topmost setting (FIG. 28) is also relevant to the Example V with the carrier 120′ with five test color rings—the odd hue stages of the lowest ring 119*a*′ serve as test color surface 32 and the even hue stages of the central ring 119*c*′ serve as test color surface 33. Where an axial shift of the carrier 120′** along two ring widths is undertaken (to the lowest position—analogously to FIG. 28*a*) then this setting corresponds to Example VI: the even hue stages of the central ring **119*c*′ serve as test color surface 32, the odd hue stages of the fifth ring 119*e*′ serve as test color surface 33. If now the single hue stages of a 24 part color circle should be set one after the other as the central color of the test color surface 32** (and thereby as the central comparison color field of a simultaneous field of vision), the same process is necessary, as that previously described for the double stage interval:

basic position hue stage 1—topmost position of the test color carrier 120′ (analogously to FIG. 28)—the test color rings **119*a*′ and 119*c*′** are in working position.
change from hue stage 1 to 2—axial shift (analogously to FIG. 28*a*), however for a double stretch, so that the test color rings **119*c*′ and 119*e*′** come into working position.
change from hue stage 2 to 3—axial return movement (analogously to FIG. 28) and turn of the carrier one hue stage.
change from hue stage 3 to 4—axial shift (analogously to FIG. 28*a*).
change from hue stage 4 to 5—axial return (analgously to FIG. 28*a*) and turn of the carrier one hue stage etc.

The process described above gives—in analogous manner—also a constant interval of two hue stages.

The change of interval width to one hue stage is caused by the test color carrier 120′ being brought into central position. In the central position the hue stages of the second ring 119$b'$ form the test color surface 32, while the hue stages of the fourth ring 119$d'$ serve as test color surface 33 (FIG. 29). If the different hue stages of a 24 part color circle are to form the central color of the test color surface 32 one after the other (and therefore to be set as the central comparison color field of a simultaneous field of vision), this only needs a turn of the test color carrier 120′ without any axial shift.

For maintaining carrier 120′ in each of the three settings without hindering rotation around its longitudinal axis, there are provided spring pressed balls 123 (FIG. 29) mounted in openings in a shaft 124 on which the carrier 15 is mounted, the balls being adapted to engage in annular notches 122 when the carrier is shifted. In the case in which the carrier 120 is utilized for a constant double stage interval according to FIG. 27, one of the two stops is eliminated.

Figure 30:
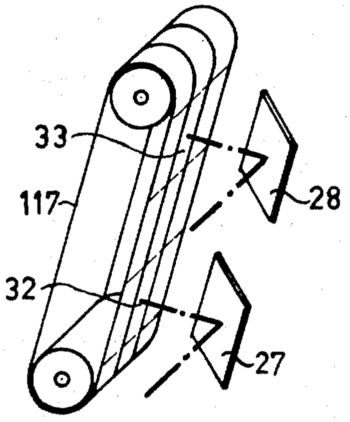
Figure 31:
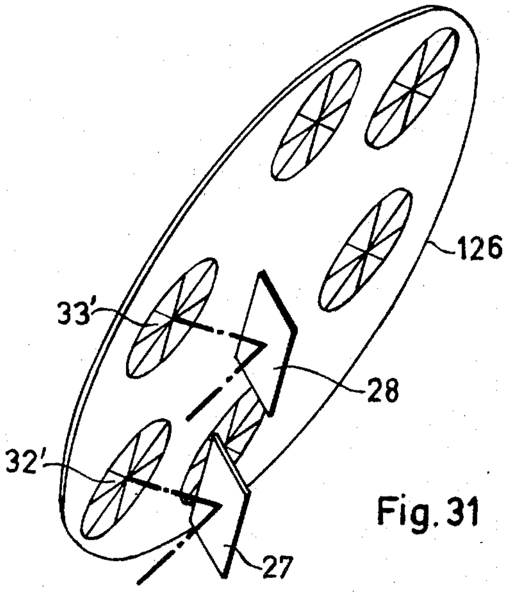
Figure 32:
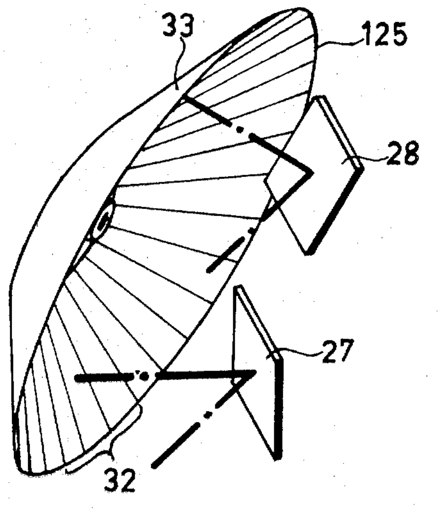
Figure 33:
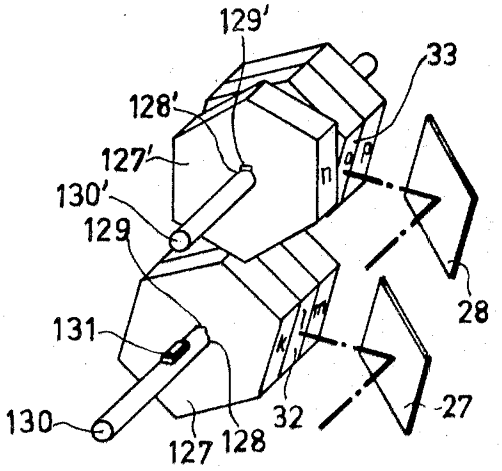

For constant intervals of one or two hue stages, in the comparison of textiles, e.g. silk dyeing, the colors should be incorporated in the form of a band 118, as shown in FIG. 30. However, a test color carrier 125, in the form of a hollow cone, is found suitable, when e.g. such hollow cones with test color samples (standards) are to be inserted into the apparatus and then quickly substituted. It is also possible to choose the angle at which the test color surfaces are located with relation to the ray path by means of the cone angle. This can be desirable, where test colors with glossy surface are to be used, e.g. color lacquers, for quality control.

For producing test color regions arranged in sectors or in concentric zones for the simultaneous field of vision, a disc-shaped carrier 126 (FIG. 31) is provided. For the determination of very small color differences or for tests of color sense, the different colors of the test color surfaces 32 and 33 can be arranged on the side surfaces (e.g., *k, l, m, n, o, p*) of two prismatic bodies 127 and 127′ (FIG. 33) formed by a plurality of discs, which are individually movable, the different discs having bores 128, 128′ and slots 129, 129′ for shafts 130, 130′ provided with short keys 131.

Figure 22:
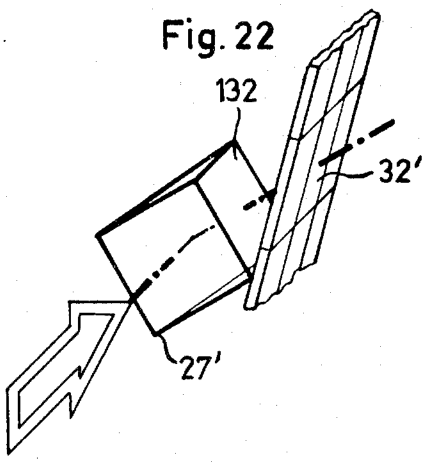
Figure 23:
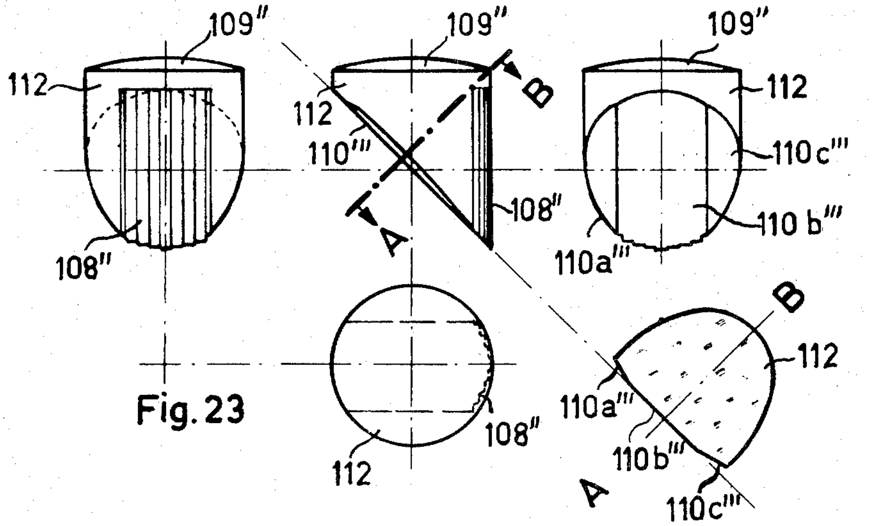
FIG. 23 shows in plan view, front view, and two side views, as well as a diagonal section A–B, a light-deviating unit having a cylindrical body of truncated form with a cathetus surface with ridges and a hypotenuse surface of three planes, the other cathetus surface being of convex spherical shape.
Figure 24:
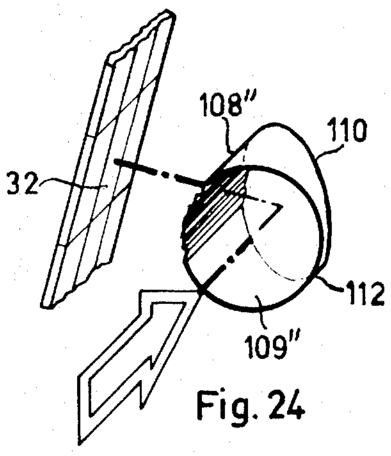
FIG. 24 shows the cylindrical light-deviating unit illustrated in FIG. 23 in its operative position.

The test color surfaces can also, however, be formed by transilluminated filter material. In such a case the test color surfaces, e.g. 32′, will be transilluminated by ray bundles, via the associated light-deviating units (FIG. 22). In such case, it will also be suitable to provide dispersing means, e.g. a dull cathetus surface 132, to assure uniform illumination.

In the embodiments shown in FIGS. 27, 29, the scale 133 shown in FIG. 1 for the hue stage numbers will preferably be adapted directly on the axially shiftable carrier 120 or 120′ at its upper part 134 or 134′ next to the last test color ring 119$e$ or 119$e'$ and consist of the numbers of those test colors, which can be brought to the site of the test color surface 32. The hue stage number of the color visible in the center zone of the simultaneous field of vision can be read off the scale in each case. With a test color arrangement in hollow cone form the hue stage numbers will be applied at the edge or on the mantle of the cone near the base and will be brought into the ray path of the mirror 46 and 47 by a different setting of the mirror 135 (FIG. 1).

Figure 13:
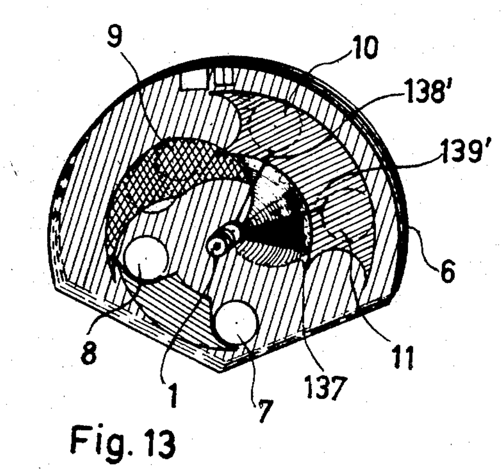
FIG. 13 is a perspective view of round diaphragm plates of glass.

As represented in FIG. 34, the different scales are visible side by side in the reading window 12 with the reading mark 13. The scales can be read off without moving the eye from the ocular by movement of the movable reading mirror 47 through a movement of the lever SK, so as to bring the mirror in the ray path. All values of the color attributes can be seen together through the ocular e.g. in the standardized sequence—hue stage, decimal fraction of the hue stage, saturation stage (degree of white), darkness stage (degree of black)—the measurement result being seen with one glance as a compact combination of figures. The scales for saturation and darkness stage run from minus 100 to zero and on to plus 100. Minue values show that the light regulation is not being effected in the test color ray path, but in the sample ray path. This arrangement is provided in cases in which the sample color is more intensive (purer) than the test color present. So as to make negative measuring values specially noticeable, the series of positive measuring values is arranged in accordance with the invention, as is usual with nomograms, to the right of the calibrating fractions on the scale, the series of negative measuring values, however, to the left (FIG. 34). By means of this symbolic arrangement, reading-off mistakes with reference to the prefaced sign can be avoided. There exist further possibilities of arranging the scales as suitable for the most differentiated purposes. In one way, the already mentioned negative measuring values can also be arranged as white figures on black background (FIG. 35). For certain technical processes, e.g. for mixture of color substances it will be suitable to add also different, e.g. percentages calibrated scales apart from perception stage calibrated scales 15, 17. Scales 15′, 17′, which are used to read off light quantities or diaphragm openings and possess nearly logarithmic subdivision, can serve as a valuable addition (FIG. 10). A specially clear auxiliary arrangement consists in fitting the diaphragm plates with a graphic presentation—e.g. a triangular diagram. In accordance with the invention such diagrams not only includes the fields hitherto usual in the color systems with positive measuring figures, but also those fields, in which one of the two values becomes negative or even both values for the color determination ratio have a negative sign prefaced. The possibility according to the invention, to see the site of the color directly included in a diagram, is of great advantage. In accordance with the invention the immovable diaphragm plate 6 or 6‴ possesses the diagram screen 136 or 137, while the two movable diaphragm plates 3 and 4 or 3‴ respectively are outfitted with especially long additional calibration lines 138 and 139 or 138′ and 139′ respectively, crossing each other over the diagram and, according to their position characterize the site of the determined sample color as intersection of the long calibration lines. For diaphragm plates which are guided in parallel, there is an exemplary form of execution presented in FIG. 12 while FIG. 13 shows a form of execution for diaphragm plates, which are rotatable around the common shaft 1. FIG. 13 uses a section of a polar coordinate system with logarithmic calibration. The concentric circle for the designation of the point of intersection is shown by a calibration line 138′ intersecting the circular arc-extensions outside of the diagram. On the circle line so designated the site of the determined sample color is designated by the intersection point with the long calibration line 139′ of the coordinated diaphragm plate, e.g. 4. With the aid of these diagrams directly on the apparatus, the understanding of connections is greatly eased. Particularly in the field of color determination a lack of clearness exists in different areas. Even within the same national language the expressions do not find uniform use. No operating instruction plates are used on the apparatus because of language difficulties. Instead a universally understood color symbolism is used for the operating organs, which will be understood by all. Those hand setting knobs, which are used to achieve a change in the chromatic quality of the test colors seen (the manual setting knobs A and B) will be made (e.g. of a plastic material) in red color. The manual setting knob C, controlling saturation (admixture of white) is of white color (of white plastic or aluminum) and the manual setting knob D, by means of which the dark stage (admixture of black) is set, is made of black plastic or hard rubber. In this way the determination of the action of the operating organs is unmistakably characterized and easily understood by everybody, even laymen.

It is usual to check each measuring apparatus for its zero position. With color measuring apparatus it is usual to refer all values to a mat-white surface. In the case of the present invention mat-white surfaces 140 and 140' are incorporated in front of the test color surfaces 32 and 33( FIG. 36), and possibly by way of analogy also in front of the test color surfaces 34 and 35. The two white surfaces 140 and 140' for the test color surfaces 32 and 33 are preferably joined together as a unit, and they are arranged for shifting parallel to the test colors, e.g. by the width of a test color ring. In operative position, the recess 141 between the two mat-white surfaces 140 and 140' shows the test color surface 32. Checking for zero position is effect by shifting the two mat-white surfaces 140 and 140' in front of the test color surfaces 32 and 33, while a similar mat-white surface serves as sample 36. The movable diaphragm plates 2, 3, and 4 are set for zero—the position of the carrier of the test colors, e.g. of the dodecaedral prism 118 shown in FIG. 36 being of no importance, this carrier being fully covered by the faded-in mat-white surfaces 140 and 140'. With correct functioning of the apparatus the whole of the simultaneous field of vision seems to be filled with uniform brightness.

In accordance with the invention the light-deflecting elements have been improved. In the production of light-deflecting elements as disclosed in my previously cited copending application, the angles of the surfaces, which are slightly inclined towards each other, must be adhered to with great exactitude. For large production orders it will be necessary to have high precision, and special tools. For smaller series, however, these surfaces can be made adjustable, as particularly with different single units for special purposes (e.g. different samples at different distances in or before the apparatus, differently strong magnification of the sample, etc.) it must be possible to have these surfaces brought into any desired angle positioning. In accordance with the present invention there are now provided, in an embodiment represented in FIG. 37, the different surfaces 42*a* to 42*i* of the light-deflecting element 42, which are slightly inclined towards each other, these surfaces being linked with each other, so as to be able to swivel by means of indentations 65, 65'. In an embodiment comprising nine matching sites (FIG. 37) one of the mentioned surfaces of each group, e.g. the surface *b* from the group *a*, *b*, *c*, is fixedly connected with a common carrier 66. This carrier 66 possesses means of setting, e.g. screws 67, the necessary angle of inclination of the edge surfaces of the corresponding group, e.g. *a* and *c*. The groups themselves, e.g. the group *a*, *b*, *c*, and the group *g*, *h*, *i*, are also adjustable relative to each other, e.g. by means of screws 67', extending through a ledge 68.

If a very small sample area is to be examined or if a simultaneous field of vision is employed, in which all the different comparison color fields are arranged in one large sample area, then, in accordance with the invention, known optical elements for magnification, e.g. a lens 69 or 69' is arranged in the ray path in front of or behind the slightly inclined surfaces of the light-deflecting elements 42 or 49 (FIGS. 1 and 46). If the different surfaces, 42*a* to 42*i*, are provided with a lesser relative inclination to each other, the shorter the focus of the said optical element. In this special arrangement therefore a simple light-deflecting element replaces the multiple light-deflecting body, the element being possibly a prism or a mirror 70, where there is no provision for any bending of the ray path, may be left out altogether.

In a further realization of the invention, a group of novel construction parts will be described, possessing multiple light-deflecting characteristics as well as magnifying properties at the same time. If different single surfaces of a multiple light-deflecting element are provided with a slight curvature, this causes the single rays of each of the (e.g. nine) ray bundles, considered singly, to converge, while apart from this the axes of these ray bundles also converge.

In FIG. 38 there is shown a multiple light-deflecting element 42'', which consists of specular metal pieces as in FIG. 37, wherein the specular metal pieces 42*a''* to 42*i''* are slightly concave (e.g. as toric concave mirrors).

The multiple light-deflecting elements which is made of light-refractive material can now in accordance with the invention, have one of its surfaces made convex (FIGS. 39, 44). In FIG. 42 an analogous example is represented in round form with plane surfaces 58.

If a one-sided plane element is desired and higher tooling costs are acceptable, each of the surfaces which are slightly inclined to each other, 49*a''* to 49*i''* can be supplied with a slight curvature additionally (FIG. 43).

In another arrangement, which shows advantages in respect of elimination of image defects the surfaces 49*a'''* to 49*i'''*, slightly inclined to each other, are formed each with their own convex surfaces 55*a* to 55*i* (FIG. 44). The analogous example, of round formation 57'', is illustrated in FIG. 45 and possesses a convex surface 56 for each of the plane surfaces 58.

These convex surfaces, associated with the single slightly inclined surfaces, can be individually fixed to special lenses but it is also possible to arrange all the surfaces in question directly on the surface of the light-deflecting element.

The multiple discontinuous, preferably specular surface 43, which determines the form and division of the simultaneous field of vision, may according to the intended use, be mounted in the apparatus either fixedly or interchangeably. If the surface is to be changed very frequently, it is advisable to provide an inclined disc 142, having a plurality of variously shaped discontinuous surfaces 43 (see FIG. 46).

It can also be advantageous in some cases, e.g. for color sense tests, to provide individual surfaces 43' with a colored surface, preferably with mat colors (FIG. 52).

Individually interchangeable discontinuous surfaces 43' (FIG. 52), in the form of strips, can be particularly valuable, where it is necessary to test somebody who is simulating color blindness and who, for this purpose, has become familiar with the simultaneous fields of vision built in the apparatus, because now new, completely different-looking simultaneous fields of vision can be inserted.

If the use of several discontinuous surfaces, arranged on an inclined disc 142, is to be combined with the possibility of inserting a single surface 43', it will be necessary to provide, in addition to the guideways in the rear housing part 156, a slot 143 of a size equal to a field of vision in the inclined disc 142 (FIG. 46).

For certain other types of simultaneous fields of vision, it is advisable to use a horizontal disc 144 (FIGS. 1 and 49), which, if used in combination with an interchangeable discontinuous surface 43', should be provided with an opening 145.

It is desirable to periodically alter the borderlines between the comparison colors and the sample color in the simultaneous field of vision for the purpose of varying the areas of the retina stimulated by the sample image and the comparison colors. In order to alter the borderlines between the comparison colors and the sample color in the simultaneous field of vision, the multiple discontinuous surface 43 is movably mounted on a carrier member 146 (FIGS. 47, 48) which is shiftable for a fraction of the width of the field of vision by operating a pushbutton 148 against the force of a spring 147. The previously mentioned horizontal disc 144, which is provided with a plurality of discontinuous surfaces 43 (FIG. 49), instead of the single discontinuous surface 43, is rotatably mounted on a shaft 149 supported by a bearing block 150 and is shifted in like manner by means of a pushbutton 148' against the force of a spring 147'. The arrangement is such that a shift of the simultaneous field of vision of at most one millimeter will be produced.

In order to minimize conditions of fatigue, the sample color or the comparison color is temporarily eliminated in the simultaneous field of vision. For this purpose there is provided a cover slide 151 (FIG. 50) which is movable by means of a lever 152 of the toggle switch type. If it is desired to have the simultaneous field of vision temporarily filled completely only by the sample color, the multiple discontinuous surface 43 will be mounted directly on the slide 151 for this purpose. On operation of the lever 152 the multiple discontinuous surface 43 is suddenly removed from the ray path and the test color surfaces normally reflected by it vanish from the field of vision.

Another way of increasing observer capability is by replacing the sample color or the comparison color temporarily with differently colored, or dull visual impressions. For this purpose there is provided a coverslide 151′ (FIG. 51), similar to the slide 151 described above, the slide 151′ being arranged, e.g. in the sample ray path below the multiple discontinuous surface 43, or below the horizontal disc 144 (FIG. 1), or below the inclined disc 142 (FIG. 46). The surface of the cover slide 151′ is given the desired substitute color. Operation of the lever 152′ allows a view of the sample or covers the same with the substitute color. If instead of the sample ray path the test color ray path is to be interrupted, a similar arrangement is to be made between the optical device for light mixing, e.g. the set of glass plates 38 and the deviating mirror 40, preferably in a plane perpendicular to the ray path.

For carrying out that step of the method which consists in controlling the simultaneous field of vision with contrast improvement for a clearer recognition of minimal color differences, there is provided a rotatable disc 153 with light filters 154 arranged in the ray path between the multiple discontinuous surface 43 and the oculars *Oc* I, *Oc* II, *Oc* III (FIGS. 1 and 3). In large scale production of apparatus of the type provided by the present invention, deviations often occur which lead to different measurement values. The manufacture of optical apparatus by the usual precision methods requires particularly careful adjustment, which is a costly operation. In accordance with the present invention, the ray path was therefore arrange in a single plane, making it possible to arrange all optical elements also in a single plane and to mount these elements in a plane parallel to that plane. Housing G is therefore made in two approximately equal parts 155 and 156 (FIGS. 52 and 53) and divided along plane 157 of the ray path.

For mirrors, glass plates and similar optical parts, pressed-in step-type mounting elements 60 with pressed-in nuts 161 (or with threads cut simultaneously by a multi-spindle machine) are provided. Opposite each mounting element 160 are stops 162 with inclined guide surfaces 163 and 163′, co-acting with the inclined counter surfaces 164 and 164′ on a small cover plate 165 (FIG. 66). The cover plate 165 is resiliently supported on a disc 166 of foam rubber and fixed with a screw 167. When this screw is tightened, the guide surfaces 163 and 163′ slide downwards along the counter surfaces 164 and 164′ and the clamp holder 168 secures the optical element to be held, e.g. a glass plate 37 (FIG. 64). To decrease the danger of breakages, the distances between the mounting element 160 and the clamping jaw 168 will be somewhat enlarged and soft spacers, e.g. of thin rubber, soft cardboard, elastic plastic material, etc. will be inserted.

To allow comfortable use of the apparatus a double ocular *Oc* I and *Oc* II is provided on the housing. If this double ocular is surrounded with a screen 170 of foam rubber (FIG. 63), the apparatus can be used with spectacles. Incident side light and disturbing reflections due to the spectacle lenses are avoided. One non-movable diagonal mirror 171 and 172 each, as well as a mirror 174 rotatable around its axis through 90 degrees by means of the setting member 173, are arranged for the alternating use of oculars *Oc* I and *Oc* II. Using known optical elements for ray division, it is possible to use oculars *Oc* I and *Oc* II at the same time, which however decreases the light intensity of the arrangement by half.

Color determinations should take as little time as possible during control operations because colors applied when wet can dry during measurement. Since a decision concerning measures of correction is usually made by several people jointly, a third ocular *Oc* III is provided in accordance with the invention for a second observer. For this third ocular *Oc* III a stationary diagonal glass plate or a semi-transparent mirror, can be arranged in the ray path for ray division. If the loss in light intensity caused by this is to be avoided, it will be advisable to design an ordinary mirror 175 for insertion in the ray path (FIG. 1). While the first observer works on the oculars *Oc* I and *Oc* II and controls determination by means of the manual setting knobs A, B, C, and D, the second observer can insert his mirror into the ray path for a short period and control the setting. The mirror 175 is preferably carried on a joint carrier 176 together with the ocular shell *Oc* III, which carrier is manoeuvred by means of an operating member 177. The color determination of fluorescent colors demands a quartz lamp to supply the ultraviolet light. Quartz lamps of the usual known types cannot be used, because these lamps develop great heat and furthermore illuminate the whole frontal surface of the apparatus—therefore also the test colors. According to the invention therefore a housing or mantle 180 is provided with a cooling blower 181, making it possible to employ a small quartz burner 182 alone, and provide a passage 183 in the housing directly in front of the transparent area 7′ of the front housing part 155, which area is coordinated with the sample 36. Within the housing G is a housing opening 7′ having a wide slot 184 for an ultraviolet filter 185 (black glass). Tests with a quartz burner 182, thus adapted and cooled, have shown, that after one hour continuous burning, the tubular housing 180 proved to be only a little warmer than body temperature.

As mentioned, the present invention mainly relates to the design for a universal apparatus, which may be used for the greatest variety of samples. For this reason the ray path is designed in such a way that the sample ray path passes between the diaphragm plates 2, 3, 4, and 6 and the multiple light-deflecting element 42 via a special, exchangeable insert piece. Such insert pieces 48′, which are executed in the form of a drawer, are to be inserted in an opening 186 of the rear housing part 156 and can be fixed by means of knurled screws 187 and 187′ in the threaded bores 188 and 188′ (FIGS. 3 and 52). According to the present invention, the insert pieces are made differently according to the consistency or the aggregate state of the sample in question, as well as with respect to the elements holding the sample in its place prescribed for the determination, as well as with reference to the position of the light-deviating units 31. The single insert pieces 48′ differ according to their intended use, their interior fittings and the arrangement of the latter relative to the sample ray path.

According to the setting of the light deviating-unit 31, arranged in the insert piece, the light rays destined for the illumination of the sample enter through the transparent area 7 and the housing opening 7′, either vertically downwards, diagonally downwards, diagonally upwards or projected horizontally towards the same in question and either illuminating or transilluminating it. In this manner the variously defined, standardized angles of illumination and any desired direction of illumination can be realized. This is of substantial importance and enables the apparatus to be used with various types of samples, each having its own illumination requirements. The light-deviating units 31 are advantageously mounted immovably in the different insert pieces to supply the necessary angle of illumination for the samples to be carried by the insert pieces. If variable angles of illumination are desired, the light-deviating unit 31 may be rotatably mounted and the outer side of the insert piece (e.g. **48*d*′ in FIG. 52) provided with a turning knob 190 and a scale 191**.

The angle of observation of the sample is dependent on the angle setting of the deviating mirror 41, which can direct the sample ray path e.g. vertically downwards, diagonally downwards or diagonally upwards onto the sample 36 or 36' (FIGS. 1 and 46). In this way it is also possible to realize all desired angles of observation. If a sample e.g. a liquid 36'' in a cell 193 (FIG. 58) is being observed directly, the deviating mirror 44 is left out.

In this manner every desired combination of preferred angles of illumination and suitable angles of observation can be achieved. Generally the test arrangements shown in FIGS. 54 to 62 will be used. Along side each of the insert pieces 48' to **48*h*'** the associated sketch shows the schematic course of the ray path within the insert piece in question.

In FIG. 54 is shown an angle of illumination of 45° with an angle of observation of 90°.

These are normal comparison conditions in which the color of a surface is observed, and the effect of gloss is eliminated.

FIG. 62 shows an angle of illumination of 45° with an angle of observation of 90° which is suitable with ultraviolet light producing a fluorescent color.

FIG. 57 shows a 45° angle of illumination upward and a 90° angle of observation from below.

This arrangement is suitable for the determination of colors of powders, granulates, etc., as well as for the observation of surface colors of liquids, such as oils, fats, wood stains, etc. The arrangement is also applicable for the determination of fluorescent colors of powders, granulates, liquid surfaces, etc.

FIG. 55 shows an angle of illumination of 90° with an angle of observation of 45°. This arrangement allows so-called diagonal viewing or "review" observation of surfaces.

FIG. 55 is also a suitable arrangement for the determination of fluorescent colors of surfaces in diagonal observation.

FIG. 56 shows an angle of illumination of 60° and an angle of observation of 60°. This observation is suitable for the degree of gloss of surfaces. With this arrangement the surface of a sample is observed by interposing a scattering element, e.g. a focussing screen 196. The same arrangement can also be executed for a certain position (the so-called "Kipp-Stellung" according to DIN 5033), wherein the normal plane of the sample is set for an angle of 22.5 degrees against the direction of illumination and observation, whereby it is possible to achieve 67.5 degrees illumination and 67.5 degrees observation.

FIG. 58 shows an illumination angle of 0° and an angle of observation of 0°. This arrangement is applicable for the observation of transparent samples. Between the light-deviating unit 31' and the sample, e.g. a liquid 36''' in a cell 193' a scattering element, e.g. a focussing screen 196' is arranged. The cell 193' can be inserted through the opening 200 into the insert piece **48*d*'**.

FIG. 59 shows an angle of transillumination between 15° and 0° and an angle of observation of 0° for bright, severally transilluminated liquids or gases.

By this manner, transillumination is repeated and absorption is increased. If a greater layer depth would have to be used, e.g. for a bright liquid, the normal cell sizes of 30 to 50 mm. depth would not suffice, and multiples of this depth would be necessary.

FIG. 61 shows a vertical transillumination with a 0° observation of concentrated liquids in very thin layers, e.g. on microscope glasses.

The insert piece **48*g*' possesses a slot 209, into which a sample 36'''', e.g. a drop of mordant is inserted between microscope glasses 208 and 208'** (similar to slides for blood counts). A similar arrangement can also be produced for color films.

FIG. 60 shows direct illumination with UV-light, across the direction of observation, and 0° observation of the fluorescent color of liquids or gases in cells. In this arrangement, the light-deviating unit 31 is eliminated, in place of which is found the cell 193''' with the sample 36'''.

The following construction parts and accompanying sketches are represented in FIGS. 54 to 62:

The light-deviating units 31' in FIGS. 54 to 61 are cylindrical, while that represented in FIG. 62 is a flattened ellipsoid with an upper reflecting surface 115. The openings in the floor plate of the insert pieces (FIGS. 54, 55, 56, and 62) are designated 195, 195', 195'', and 195'''. A small focussing screen 196 is shown in FIG. 56, a large focussing screen 196' is shown in FIG. 58. FIG. 57 represents an insert opening 197 for a cell 193 with a powder-form sample 36'', while a support plate 198 with an opening 199 is provided for the cell 193.

The insert pieces **48*d*', 48*e*' and 48*f*' respectively, shown in the FIGS. 58, 59, and 60 possess large openings 200, 200', and 200'' respectively in their rear walls for the insertion of cells 193', 193'', and 193''' respectively. In FIG. 59 a diagonally placed mirror 201 with an opening 202, as well as a scattering element, e.g. a mat-white surface 203 in the insert piece 48*e*' are arranged for the repeated transillumination of bright samples 36'''**.

In FIG. 60 the incoming light reaches a cell 193''' directly without the use of a light-deviating unit. When using ultra-violet light the sample 36''' will show fluorescence phenomena, which are observed across the direction of illumination against a dark background. In the example presented the dark background consists of an internally blackened cavity 204 with a window 205.

For the arrangement presented in FIG. 61 for the determination of colors of thin layers 36'''', apart from the light-deviating unit 31' there is required a deviating mirror 206 and a scattering element e.g. a mat-white surface 207. The sample 36'''' situated between thin glasses (microscope glasses) 208 and 208' is inserted through a slit 209 on a fitted-on setpiece 210 with a passage opening 211 and observed by means of the deviating mirror 41.

Figures 4, 5, 6, 7:
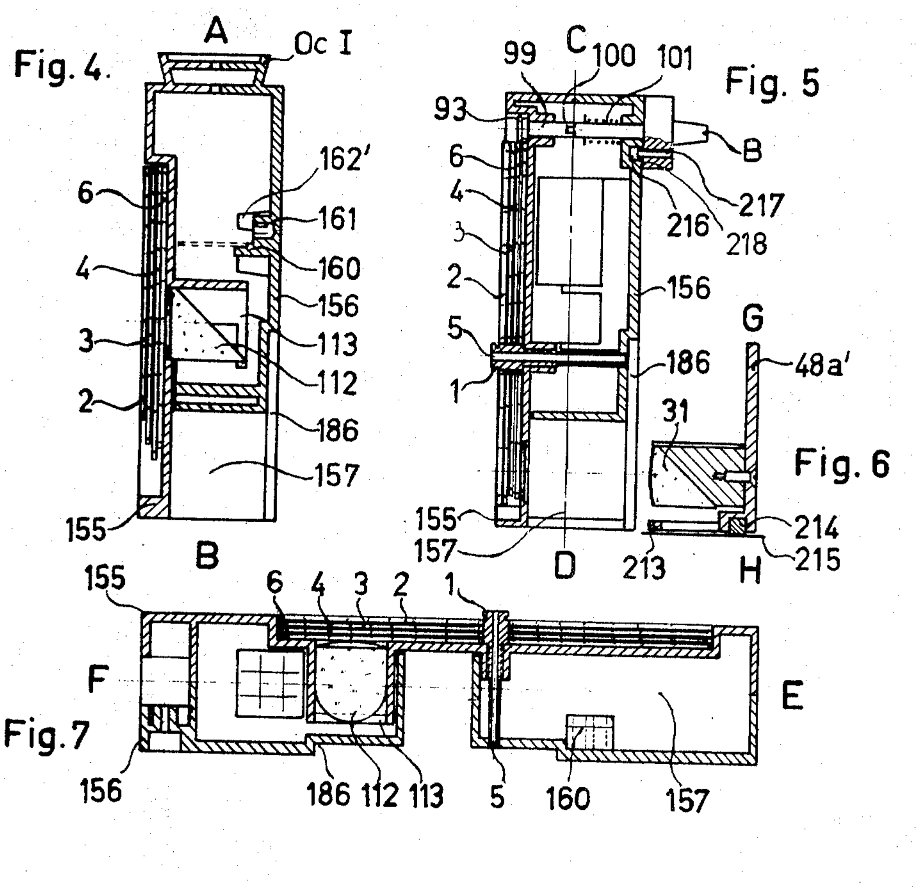
FIGS. 4 and 5 show vertical sections of FIGS. 2 and 3 along the lines A–B and C–D.
FIG. 6 shows a vertical section along the line G–H of FIG. 5.
FIG. 7 represents a horizontal section along the line E–F of FIGS. 2 and 3.

As can easily be noted, all the usual comparison conditions and others still can be produced. The exchange of the different insert pieces 48' amongst each other only needs a few manual operations. The bottom plate 213 of insert pieces, e.g. of **48*a*' (FIGS. 6 and 55) can be provided with permanent magnets 214, cooperating with a steel plate 215 and holding thin samples 36 against the bottom plate 213** (FIGS. 6 and 63).

Instead of a simple cell, e.g. 193' a continuous flow cell 212 can be used, e.g. for the production control of moving goods. If the obstructive tissue structure, e.g. of textiles, is to be made to vanish, it is possible to provide out an insert piece with a vibrator or rotor mounted on the bottom plate 213, The three-dimensional range of color tolerances needed for color determination, which results from the three color tolerance areas for chromatic differences, saturation and darkness stage differences, constitutes a technical complication. In no other fields are there six limiting values and three specified values co-acting simultaneously. For this reason the housing of the apparatus in accordance with the invention is so designed that each setting knob B, C or D is provided with stops for the desired limiting values of the different color tolerance areas. The rear housing part 156 possesses sloping recesses 216 at the position of the manual setting knobs B, C and D (FIG. 5). In one embodiment the setting knobs B, C and D have a plurality of small screws 217, which can be threaded, as desired, singly or in pairs, from the rear side 218, of the setting knob B (FIG. 5), into the mentioned recesses 216, e.g. into the annular grooves 216' of the rear housing part 156 (FIG. 52). Since the recesses 216 or the grooves 216' slope, the setting of the knob B can be variably adjusted by selection of one of the small screws 217 and the extent to which it is turned until its tip engages the bottom area 219 of the annular groove 216'.

Such setting is suitably performed as follows: assuming that the stops were to be set for a color tolerance range of plus/minus two tenths hue stage for a color 24.2. The limiting values of a color 24.2±0.2 are therefore 24.0 and 24.4. At the manual setting knob B the stops are therefore to be set for 0.0 and 0.4—the full hue stage 24 is set separately by means of the setting knob A. The reading mirror 47 is brought in (by means of the lever SK), a look is taken through the ocular and the setting knob A is turned until 24.0 is brought to the reading mark 13 (FIG. 34 or 35). Then the setting knob B is turned until the value 24.4 stands at the reading mark 13. Then the small screw 217 shown in FIG. 52, which is found to the right of the lowest screw 217' of the ring, vertically under the manual setting knob B, is turned down to the stop. Thereby the screw 217 now touches the topmost part of the sloping bottom 219 of the groove 216' and can now no longer be turned clockwise.

Now the manual setting knob B is turned slightly counter-clockwise to ascertain whether upon clockwise rotation the stop is correct and the desired limiting value (in the example: 24.4) can be seen through the ocular at the reading mark. Then the setting knob is turned counter-clockwise with control through ocular I or ocular II, until the second limiting value 24.0 stands at the reading mark 13. Then a second small screw, e.g. 217'' (FIG. 3), which is found (seen counter-clockwise) in front of the mentioned screw 217, is also screwed in to the stop. The setting is then again controlled through a short turn clockwise and back. After a possible fine correction the stops are set and the way of the manual setting knob B is limited for ±0.2. The same process is performed with the tolerance values of the two other scales for saturation and darkness stage at the manual setting knobs C and D. In this way, the apparatus has been set for a combination of color tolerance values. If now with the set apparatus a color is examined to determine, whether it is still within the permitted three-dimensional range of color tolerances, the specified values are set and then the sample 36 is introduced. Now a try is made to obtain visual correspondence of the color of the sample 36, e.g. at the centrally arranged coarse-matching place of the simultaneous field of vision by a seeming blending of the comparison color field and sample color field in said matching site. If this is possible, then the tested color is within the permitted range of color tolerances. An exact setting for equality is not necessary, so long as inasfar none of the manual setting knobs has come to a full stop. In such case, where one or even two setting knobs are at their stops, irrespective of which of the stops is concerned, the sample color is at the tolerance limit. If, for instance, only a falling-off of saturation, but no visual rise is possible, because the movement of the manual setting knob C is hindered by one of its stops, then the limiting value in question for saturation has clearly been exceeded.

Controls can be performed quickly one after the other, at first with each of the manual setting knobs C, B, and D alone, then in pairs moving together (clockwise, then counter-clockwise), then further in pairs in a counter sense, finally through setting of the extreme positions (maximal hue deviation, maximum saturation deviation, maximal darkness stage deviation in the plus direction—then in the minus direction). Thereby all permitted colors can be made visible continually in the simultaneous field of vision—all colors lying outside the tolerances are locked by the stops in the manual setting knobs and cannot be set.

It is to be expected, that the present invention will play a decisive part in the practical introduction of color standards into the practice. The simultaneous field of vision, supplemented by additional method steps, such as temporary removal of colors, color different impressions, movement within the field of vision and additional controls by means of filtering, allows through inclusion of all these possibilities in a single small apparatus a hitherto unavailable visual comfort for the apparatus of human vision. Furthermore the different kinds of described multiple light-deflecting elements with simultaneous magnification effect make it possible to produce "color magnifying glasses."

What is claimed is:

1. A visual method of performing color evaluation of a color sample, said method comprising producing in a viewing plane an image of a plurality of separate color comparison regions by selectively combining the three color attributes in the comparison regions such that the colors of the comparison regions differ only slightly from one another, producing images of a small area of a color sample and distributing the images of said sample area in juxtaposition with each comparison region in said viewing plane whereby there is produced in said plane a simultaneous field of vision with matching places at which the color of the sample is visible sharply and without blending with the comparision regions so that the color of the sample can be visually compared with that of said comparison regions to establish visual correspondence of the sample with one of said comparison regions, and temporarily eliminating in the simultaneous field of vision at least one of the matching places thereof the image of the sample or of the juxtaposed color comparison region to leave only the other image thereat.

2. A visual method of performing color evaluation of a color sample, said method comprising producing in a viewing plane an image of a plurality of separate color comparison regions by selectively combining the three color attributes in the comparison regions such that the colors of the comparison regions differ only slightly from one another, producing images of a small area of a color sample and distributing the images of said sample area in juxtaposition with each comparison region in said viewing plane whereby there is produced in said plane a simultaneous field of vision with matching places at which the color of the sample is visible sharply and without blending with the comparison regions so that the color of the sample can be visually compared with that of said comparison regions, simultaneously varying at least one of the color attributes of the colors of the comparison regions to establish visual correspondence of the sample with one of said comparison regions, and temporarily replacing the image of the sample color and the image of the comparison color at at least one matching place in the simultaneous field of vision by a dull color image.

3. A method as claimed in claim 2, wherein the original color image and the dull color image are presented during periods of substantially equal length of substantial duration whereby distinct images are presented and blending of the colors is prevented, the change from one color to the other being effected rapidly.

4. A visual method of performing color evaluation of a color sample, said method comprising producing, in a viewing plane, an image of a plurality of separate color comparison regions by selectively combining the three color attributes in the comparison regions such that the colors of the comparison regions differ only slightly from one another, producing images of a small area of a color sample and distributing the images of the sample area in juxtaposition with each comparison region in said viewing plane whereby there is produced in said plane a simultaneous field of vision with matching places at which the sample images are visible sharply and without blending with the comparison regions, and distinct borderlines are formed between the comparison regions and the images of the color sample, and periodically altering said borderlines between the images of the comparison colors and the sample color at at least one matching place of the simultaneous field of vision by shifting the borderlines in each of said places.

5. The method as claimed in claim 4, wherein the original and shifted borderlines are presented during periods of substantially equal length of sufficient duration so that distinct images are presented and blending of the colors is prevented, the shifting of said borderlines being effected rapidly.

6. A visual method of performing color evaluation of a color sample, said method comprising producing in a viewing plane an image of a plurality of separate color comparison regions by selectively combining the three color attributes in the comparison regions such that the colors of the comparison regions differ only slightly from one another, producing images of a small area of a color sample and distributing the images of said sample area in juxtaposition with the images of each comparison region in said viewing plane whereby there is produced in said plane a simultaneous field of vision with matching places at which the sample images are visible sharply and without blending with the comparison regions so that the color of the sample can be visually compared with that of said comparison regions, simultaneously varying at least one of the color attributes of the colors of the comparison regions to establish visual correspondence of the sample with one of said comparison regions, and temporarily superimposing on the simultaneous field of vision a uniform complementary color to increase the contrast between sample color and the colors of the color comparison places.

7. Visual comparison apparatus comprising: a housing having openings for the admission of light, diaphragm means in said housing in the path of the light for controlling the amount of light which travels therepast, a plurality of standard colored objects each having a preselected highly saturated hue, viewing means for enabling visual observation of images of a colored sample object and said standard highly saturated objects in the same image plane, image means for forming and combining into one image, images of at least one of the hues, in said image planes, saturation means for combining achromatic light with light from the standard hues to vary the saturation of the standard hues which are to be observed, lightness control means for varying the intensity of light passed by the standard colored objects to the viewing means, thereby varying the observed lightness of the standard hues, imaging means for producing an image of the sample object in said image plane, and interchangeable sample holding positioning means for locating a sample object in the housing, each of the different sample objects having a particular illumination requirement which is a function of its physical characteristics, each said sample holding means including means acting in combination with said diaphragm means for supplyng the particular illumination requirement of the associated sample.

8. Apparatus as claimed in claim 7, wherein said diaphragm means comprises a stationary diaphragm plate and a plurality of movable diaphragm plates mounted in said housing in the path of rays of light entering the housing, said stationary and movable diaphragm plates having transparent and opaque areas arranged such that movement of the movable diaphragm plates causes its opaque areas to cover the transparent areas of the stationary diaphragm plate.

9. Apparatus as claimed in claim 7, wherein said image means comprises a carrier, said standard objects being constituted as a plurality of strips of graduated hues disposed adjacent one another on said carrier in at least two rows, the hues in the two rows being in alternate graduation.

10. Apparatus as claimed in claim 7, wherein said means which acts in combination with the diaphragm means for supplying the particular illumination requirement of the associated sample comprises a light deviating element of substantially truncated cylindrical form, said element having a hypotenuse surface which is reflective and a side surface along the generatrices of the cylinder facing said hypotenuse surface, said side surface having ridges therein for dispersal of light, the passage of light through said element being from an end thereof to said hypotenuse surface wherefrom the light is reflected to the side surface and passed therethrough with dispersion.

11. Apparatus as claimed in claim 10, wherein said hypotenuse surface has a plurality of inclined surfaces which are slightly inclined towards one another.

12. Apparatus as claimed in claim 10, wherein said light deviating element is mounted in its associated sample holding means for rotation about the axis of the cylinder.

13. Apparatus as claimed in claim 7, comprising light deviating means in said housing between the diaphragm means and the image means for supplying to the latter light which passes through the diaphragm means, said light deviating means comprising a prismatic member having one side which is a light reflective surface and an adjacent side which is a light dispersing surface, the latter surface being formed with a plurality of parallel ridges.

14. Apparatus as claimed in claim 12, wherein said light reflective surface has a plurality of inclined surfaces which are slightly inclined towards each other.

15. Apparatus as claimed in claim 12, wherein said prism has a third surface through which light enters which is convex.

16. Apparatus as claimed in claim 8, wherein said housing is formed in two parts that are joined together in a plane normal to the direction of light entry.

17. Apparatus as claimed in claim 16, wherein the optical axes of the different sections of the light ray path lie in a common plane which coincides with the division plane between the two housing parts.

18. Apparatus as claimed in claim 8, wherein the movable diaphragm plates are mounted on a hollow shaft, the bore of which serves for visual centering of the apparatus on the source of light.

19. Apparatus as claimed in claim 8, comprising a movable filter behind a transparent area for a color sample in the front portion of the housing to permit observation of a fluorescing color sample in ultraviolet light.

20. Apparatus as claimed in claim 8, comprising a mantle located in front of one of the transparent areas of the stationary diaphragm plate for lighting a sample, the mantle having an opening for the passage of ultraviolet light and being connected to a cooling blower.

21. Apparatus as claimed in claim 7, wherein the viewing means comprises an ocular for each eye of a viewer, each ocular being provided with an inclined stationary mirror, and wherein means rotatable through 90° is provided for causing the hue images to reach the oculars alternately.

22. Apparatus as claimed in claim 21, wherein a third ocular is provided for a second observer, together with a movable mirror, a carrier mounting the ocular and the mirror, and means for moving the ocular and mirror into the image path.

23. Apparatus as claimed in claim 8, wherein the transparent areas of at least one of the diaphragm plates are in the form of figures and sharp points which cause the incident light in those areas to be partly eclipsed even when not covered by the opaque areas of the other diaphragm plates.

24. Apparatus as claimed in claim 8, wherein color filter foils are provided at the transparent areas of the movable diaphragm plates adjacent the opaque areas, the transparent area for the sample not being covered by any filter.

25. Apparatus as claimed in claim 7, wherein said image means comprises a carrier, said standard objects being constituted as a plurality of strips of graduated hues disposed in adjacent rings around said carrier, a first of said rings consisting of a double set of alternate graduated hues, an adjacent second ring consisting of a complete single set of hues, a third ring consisting of a double set of the omitted hues of the first ring, a fourth ring consisting of a complete single set of hues, but turned by the width of one color strip, and a fifth ring identical with the first ring and also turned by the width of one color strip.

26. Apparatus as claimed in claim 25 comprising means supporting the carrier for axial and rotative movement to enable shifting the position of the rings and the strips with the hues thereon to change the hues which are illuminated by the light from the control means.

27. Apparatus as claimed in claim 8, wherein said opaque and transparent area are shaped on the diaphragm plates so that uniform rotation of the movable plates will produce irregular variation of the light which exits from the plates.

References Cited

Judd, "Introduction to Color," in "Symposium on Color," Spring meeting of the ASTM and ISCC, Washington, D.C., 1941, pp. 1–4.

WILLIAM L. SIKES, Primary Examiner

R. J. WEBSTER, Assistant Examiner

U.S. Cl. X.R.

356—173, 176, 177, 178, 189, 191, 193

UNITED STATES PATENT OFFICE
CERTIFICATE OF CORRECTION

Patent No. 3,672,780 Dated June 27, 1972

Inventor(s) Fritz Piringer

It is certified that error appears in the above-identified patent and that said Letters Patent are hereby corrected as shown below:

In the heading to the printed specification, lines 8-9, "June 26, 1965" should read -- June 26, 1963 --; after line 10, insert -- claims priority, application Austria, June 28, 1962, No. A 5208/62 --.

Signed and sealed this 19th day of December 1972.

(SEAL)
Attest:

EDWARD M.FLETCHER,JR.
Attesting Officer

ROBERT GOTTSCHALK
Commissioner of Patents

FORM PO-1050 (10-69)
USCOMM-DC 60376-P69
☆ U.S. GOVERNMENT PRINTING OFFICE : 1969 O—366-334.